(12) United States Patent
Li et al.

(10) Patent No.: US 12,627,354 B2
(45) Date of Patent: May 12, 2026

(54) BEAM INDICATION METHOD AND APPARATUS, AND TERMINAL

(71) Applicant: Huawei Technologies Co., Ltd., Shenzhen (CN)

(72) Inventors: Tie Li, Beijing (CN); Yongping Zhang, Beijing (CN); Xiaoqing Liu, Beijing (CN); Zheng Yu, Beijing (CN); Xi Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 375 days.

(21) Appl. No.: 18/352,758

(22) Filed: Jul. 14, 2023

(65) Prior Publication Data

US 2023/0361844 A1     Nov. 9, 2023

Related U.S. Application Data

(63) Continuation of application No. PCT/CN2021/072289, filed on Jan. 15, 2021.

(51) Int. Cl.
| | |
|---|---|
| *H04B 7/06* | (2006.01) |
| *H04B 7/0426* | (2017.01) |
| *H04L 5/00* | (2006.01) |

(52) U.S. Cl.
CPC ........... *H04B 7/0639* (2013.01); *H04B 7/043* (2013.01); *H04L 5/0023* (2013.01); *H04L 5/0048* (2013.01)

(58) Field of Classification Search
CPC .... H04B 7/0639; H04B 7/043; H04B 7/0696; H04B 7/06966; H04B 7/06968; H04L 5/0023; H04L 5/0048; H04L 5/005; H04L 5/0051; H04L 5/0053; H04W 72/231; Y02D 30/70

USPC .......................................................... 375/262
See application file for complete search history.

(56) References Cited

U.S. PATENT DOCUMENTS

2023/0170968 A1* 6/2023 Wang ................. H04B 7/06964
375/262

FOREIGN PATENT DOCUMENTS

| CN | 108809369 A | 11/2018 |
|---|---|---|
| CN | 110753355 A | 2/2020 |
| WO | 2019049096 A1 | 3/2019 |

OTHER PUBLICATIONS

ZTE, Enhancements on multi-TRP/Panel transmission, 3GPP TSG RAN WG1#96 R1-1901634, 3GPP, Feb. 16, 2019, total 19 pages.
CATT, Discussion on enhancement on multi-beam operation, 3GPP TSG RAN WG1#103-e R1-2007824, 3GPP, Nov. 1, 2020, total 10 pages.
Vivo, Further discussion and evaluation on MTRP CSI and partial reciprocity, 3GPP TSG RAN WG1#103-e R1-2009509, 3GPP, Nov. 4, 2020, total 24 pages.
3GPP TSG RAN WG1 #103-e R1-2008903, "Enhancements on Multi-beam Operation," Nokia et al., (Nov. 1, 2020), XP052350835, total 30 pages.

(Continued)

*Primary Examiner* — Fitwi Y Hailegiorgis
(74) *Attorney, Agent, or Firm* — Slater Matsil, LLP

(57) ABSTRACT

This application relates to the communication field, and in particular, to a beam indication method and apparatus, and a terminal. The method includes: obtaining a unified TCI state pool, where the unified TCI state pool is used for a separate TCI state pool or a joint TCI state pool; and performing separate or joint TCI state indication based on the unified TCI state pool.

33 Claims, 10 Drawing Sheets

(56) References Cited

OTHER PUBLICATIONS

"3rd Generation Partnership Project; Technical Specification Group Radio Access Network; NR; Medium Access Control (MAC) protocol specification (Release 16)", 3GPP TS 38.321 V16.3.0, Technical Specification, (Dec. 2020), 156 Pages.

"3rd Generation Partnership Project; Technical Specification Group Radio Access Network; NR; Physical layer procedures for data (Release 16)", 3GPP TS 38.214 V16.4.0, Technical Specification, (Dec. 2020), 169 Pages.

"3rd Generation Partnership Project; Technical Specification Group Radio Access Network; NR; Radio Resource Control (RRC) protocol specification (Release 16)", 3GPP TS 38.331 V16.3.1, Technical Specification, (Jan. 2021), 932 Pages.

Futurewei, "Enhancement on multi-beam operation", 3GPP TSG RAN WG1 Meeting #103-e, R1-2007546, Oct. 26-Nov. 13, 2020, 9 Pages, e-Meeting.

ZTE, "Enhancements on Multi-beam Operation", 3GPP TSG RAN WG1 Meeting #102-e, R1-2005454, Aug. 17-28, 2020, 11 Pages, e-Meeting.

* cited by examiner

P1                    P2                    P3

Network
device

Terminal

| Coresetpool index | Serving Cell ID | | | | | J/S | DL/UL |
|---|---|---|---|---|---|---|---|
| R | R | R | R | DL BWP ID | | UL BWP ID | |
| DL TCI state ID | | | | | | | |
| UL TCI state ID | | | | | | | |

FIG. 7

| Coresetpool index | Serving Cell ID | | | | | J/S | DL/UL |
|---|---|---|---|---|---|---|---|
| SRS for BM enable | SRS for AS enable | SRS for CB enable | SRS for NCB enable | DL BWP ID | | UL BWP ID | |
| PDSCH enable | PDCCH enable | CSI-RS for BM enable | CSI-RS for tracking enable | CSI-RS for CSI enable | PUSCH enable | PUCCH enable | PRACH enable |
| DL TCI state ID | | | | | | | |
| UL TCI state ID | | | | | | | |

FIG. 8

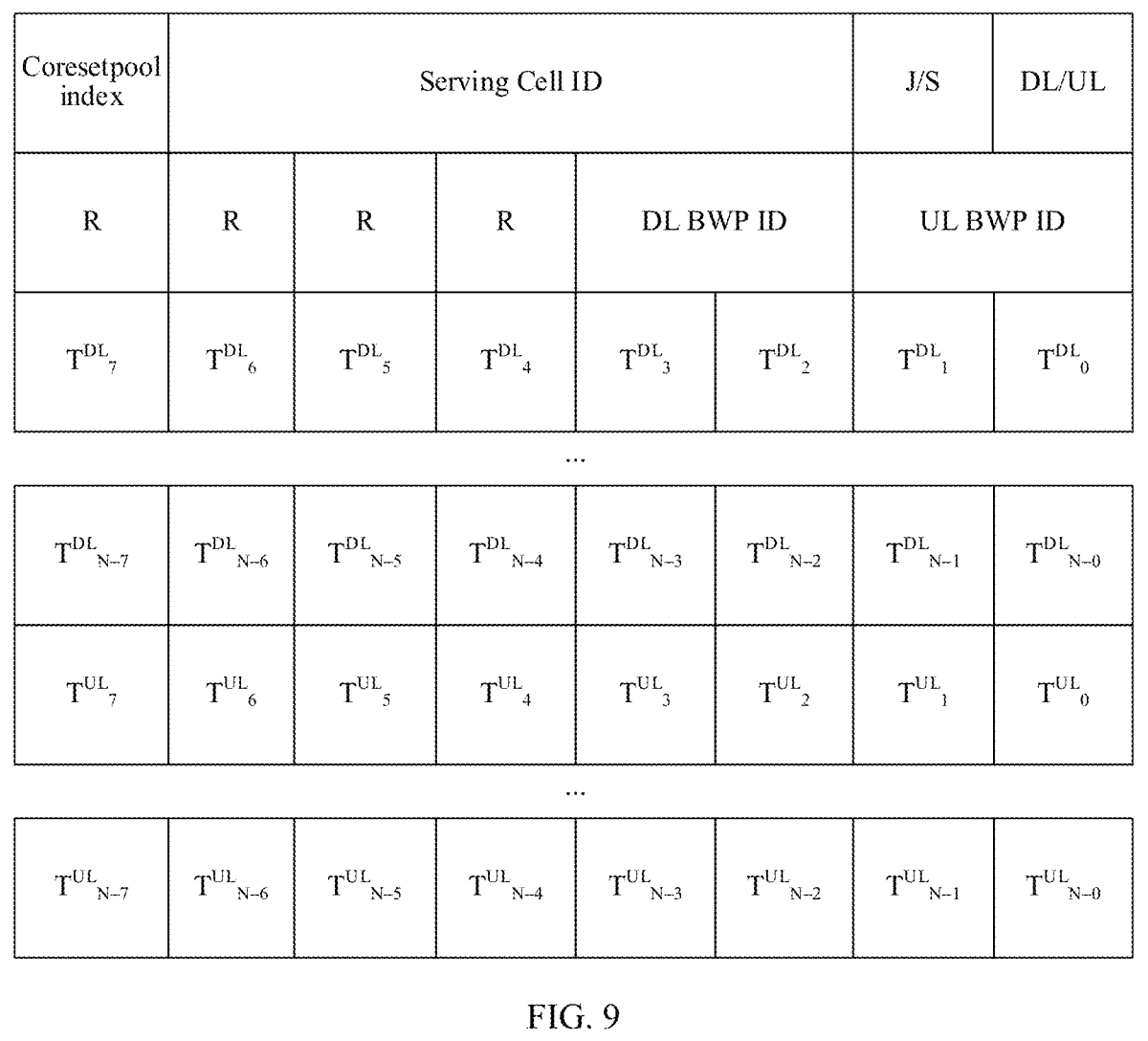

| Coresetpool index | Serving Cell ID | | | | | J/S | DL/UL |
|---|---|---|---|---|---|---|---|
| R | R | R | R | DL BWP ID | | UL BWP ID | |
| $T^{DL}_7$ | $T^{DL}_6$ | $T^{DL}_5$ | $T^{DL}_4$ | $T^{DL}_3$ | $T^{DL}_2$ | $T^{DL}_1$ | $T^{DL}_0$ |

...

| | | | | | | | |
|---|---|---|---|---|---|---|---|
| $T^{DL}_{N-7}$ | $T^{DL}_{N-6}$ | $T^{DL}_{N-5}$ | $T^{DL}_{N-4}$ | $T^{DL}_{N-3}$ | $T^{DL}_{N-2}$ | $T^{DL}_{N-1}$ | $T^{DL}_{N-0}$ |
| $T^{UL}_7$ | $T^{UL}_6$ | $T^{UL}_5$ | $T^{UL}_4$ | $T^{UL}_3$ | $T^{UL}_2$ | $T^{UL}_1$ | $T^{UL}_0$ |

...

| | | | | | | | |
|---|---|---|---|---|---|---|---|
| $T^{UL}_{N-7}$ | $T^{UL}_{N-6}$ | $T^{UL}_{N-5}$ | $T^{UL}_{N-4}$ | $T^{UL}_{N-3}$ | $T^{UL}_{N-2}$ | $T^{UL}_{N-1}$ | $T^{UL}_{N-0}$ |

FIG. 9

| Coresetpool index | Serving Cell ID | | | | | | J/S | DL/UL |
|---|---|---|---|---|---|---|---|---|
| SRS for BM enable | SRS for AS enable | SRS for CB enable | SRS for NCB enable | DL BWP ID | | | UL BWP ID | |
| PDSCH enable | PDCCH enable | CSI-RS for BM enable | CSI-RS for tracking enable | CSI-RS for CSI enable | PUSCH enable | PUCCH enable | PRACH enable | |
| $T^{DL}_7$ | $T^{DL}_6$ | $T^{DL}_5$ | $T^{DL}_4$ | $T^{DL}_3$ | $T^{DL}_2$ | $T^{DL}_1$ | $T^{DL}_0$ | |

...

| | | | | | | | |
|---|---|---|---|---|---|---|---|
| $T^{DL}_{N-7}$ | $T^{DL}_{N-6}$ | $T^{DL}_{N-5}$ | $T^{DL}_{N-4}$ | $T^{DL}_{N-3}$ | $T^{DL}_{N-2}$ | $T^{DL}_{N-1}$ | $T^{DL}_{N-0}$ |
| $T^{UL}_7$ | $T^{UL}_6$ | $T^{UL}_5$ | $T^{UL}_4$ | $T^{UL}_3$ | $T^{UL}_2$ | $T^{UL}_1$ | $T^{UL}_0$ |

FIG. 10

Obtain a unified TCI state pool, where the unified TCI state pool is used for a separate TCI state pool or a joint TCI state pool — S1101

Perform separate or joint TCI state indication based on the unified TCI state pool — S1102

BEAM INDICATION METHOD AND APPARATUS, AND TERMINAL

CROSS-REFERENCE TO RELATED APPLICATIONS

This application is a continuation of International Application No. PCT/CN2021/072289, filed on Jan. 15, 2021, the disclosure of which is hereby incorporated by reference in its entirety.

TECHNICAL FIELD

This application relates to the field of communication technologies, and in particular, to a beam indication method and apparatus, and a terminal.

BACKGROUND

To meet requirements of three scenarios, compared with 4G LTE (Long Term Evolution) that uses a low frequency band, 5G NR (New Radio) uses a newly added high frequency band (usually considered to be 6G or later), for example, a 28 GHz, 39 GHz, or 60 GHz frequency band. A higher bandwidth and a higher transmission rate are achieved by introducing a high frequency. Because the frequency is high, a signal may severely fade during propagation in space. Therefore, 5G NR uses a BF (beamforming) technology to obtain a good directional gain, so that directional power in a transmit direction is increased, an SINR (signal to interference plus noise ratio) at a receiving end is improved, and system performance is improved. In a 5G NR research process, a tradeoff between costs and performance is considered, and an HBF (hybrid beamforming) technology including digital beamforming and analog beamforming is finally used. In an implementation process of the beamforming technology, an antenna panel is a core component, and a beam is sent or received through the antenna panel. In 5G NR deployment and implementation, a directional beam is used. To meet wide-area coverage, a base station and a terminal are both deployed using a plurality of antenna panels. Especially, for the terminal, to meet coverage and in a case of limited space and cost saving, antenna panel deployment has more important impact on performance.

Because both of the base station and the terminal use the hybrid beamforming technology, a transmit beam and receive beam management problem consequently caused becomes a central problem in a 5G NR standardization discussion process. After a plurality of times of discussion, beam management content is standardized, and a beam management framework is further standardized, including beam training, beam measurement and reporting, beam indication that is for signals or channels, and the like.

However, currently, there is still no better optimization solution for how to reduce signaling overheads and a delay of the beam indication.

SUMMARY

Embodiments of this application provide a beam indication method and apparatus, and a terminal, to implement separate and joint TCI state pools and separate and joint TCI state activation or indication by using a loose TCI state pool design, so that signaling overheads and a delay of beam indication are reduced. A loose TCI state pool is applicable to both separate activation or indication and joint activation or indication. One TCI state pool may be used for uplink or downlink, or may be used for uplink and downlink.

According to a first aspect, an embodiment of this application provides a beam indication method, including:

obtaining a unified transmission configuration indication TCI state pool, where the unified TCI state pool is used for a separate TCI state pool or a joint TCI state pool; and performing separate or joint TCI state indication based on the unified TCI state pool.

In other words, in this method, the separate or joint TCI state indication may be performed based on the unified TCI state pool. The unified TCI state pool refers to a loose TCI state pool, which is applicable to both separate indication and joint indication. One TCI state pool may be used for uplink or downlink, or may be used for uplink and downlink.

TCI may represent a plurality of types of QCI relations. The TCI state pool may be represented as at least a beam pool.

In a possible implementation, the unified TCI state pool includes a first-part resource pool and a second-part resource pool;

when the unified TCI state pool is used for the joint TCI state pool, at least one of the following is included:

the first-part resource pool is the joint TCI state pool, and the first-part resource pool is used for downlink TCI state indication or activation, and uplink TCI state indication or activation;

the second-part resource pool is the joint TCI state pool, and the second-part resource pool is used for downlink TCI state indication or activation, and uplink TCI state indication or activation; or the first-part resource pool and the second-part resource pool are the joint TCI state pool, and the first-part resource pool and the second-part resource pool are used for downlink TCI state indication or activation, and uplink TCI state indication or activation; and when the unified TCI state pool is used for the separate TCI state pool, the first-part resource pool is used for downlink TCI state indication or activation; and the second-part resource pool is or the first-part resource pool and the second-part resource pool are used for uplink TCI state indication or activation.

In other words, in this implementation, the first-part resource pool and the second-part resource pool in the unified TCI state pool may be used to implement the joint TCI state pool or the separate TCI state pool. In this way, not only the joint TCI state pool can be implemented, but also the separate TCI state pool can be implemented. In addition, redundancy and complexity of system configuration and maintenance can be reduced, tracking and maintenance complexity of a terminal can be reduced, and better forward compatibility can be achieved.

In a possible implementation, the first-part resource pool and the second-part resource pool include any one of the following:

the first-part resource pool includes a downlink TCI state, and the second-part resource pool includes an uplink TCI state;

the first-part resource pool includes a TCI state whose source reference signal is a downlink reference signal, and the second-part resource pool includes a TCI state whose source reference signal is an uplink reference signal; or the first-part resource pool includes a downlink TCI state, and the second-part resource pool includes an uplink TCI state that does not overlap the downlink TCI state, where the overlapping means that numbers or indexes of the TCI states are the same, or source reference signals of the TCI states are the same.

In other words, in this implementation, the first-part resource pool and the second-part resource pool may be implemented in a plurality of manners, to implement the joint TCI state pool or the separate TCI state, and meet different indication requirements.

In a possible implementation, the TCI state whose source reference signal is a downlink reference signal includes at least one of the following:

a TCI state having a channel state information reference signal CSI-RS as the source reference signal;

a TCI state having a synchronization signal block SSB as the source reference signal; or a TCI state in which a downlink channel is used as a reference source, where the downlink channel includes one or more of a physical downlink control channel PDCCH, a physical downlink shared channel PDSCH, and a physical broadcast channel PBCH; and the TCI state whose source reference signal is an uplink reference signal includes at least one of the following:

a TCI state having a sounding reference signal SRS as the source reference signal; or a TCI state in which an uplink channel is used as a reference source, where the uplink channel includes one or more of a physical random access channel PRACH, a physical uplink control channel PUCCH, and a physical uplink shared channel PUSCH.

In other words, in this implementation, there may be a plurality of state forms for the TCI state whose source reference signal is a downlink reference signal and the TCI state whose source reference signal is an uplink reference signal, to meet different indication requirements.

In a possible implementation, when a terminal has a reciprocity, the joint TCI state pool is the first-part resource pool, or the first-part resource pool and the second-part resource pool.

In other words, in this implementation, when the terminal has the reciprocity, the first-part resource pool may be used as the joint TCI state pool, or the first-part resource pool and the second-part resource pool may be used as the joint TCI state pool.

The reciprocity mainly refers to a beam correspondence. The terminal reciprocity means that a transmit beam and a receive beam of the terminal are the same, or point to a same direction.

In a possible implementation, when a terminal has no reciprocity, the first-part resource pool is used for downlink TCI state indication or activation, and the second-part resource pool is used for uplink TCI state indication or activation.

In a possible implementation, the performing separate or joint TCI state indication based on the unified TCI state includes:

when the separate indication is performed based on the separate TCI state pool, indicating or activating a first TCI state subset in the first-part resource pool and a second TCI state subset in the second-part resource pool by using a media access control-control element MAC-CE, where the first TCI state subset is used for downlink TCI state indication and the second TCI state subset is used for uplink TCI state indication; or indicating or activating a third TCI state subset in the first-part resource pool and a fourth TCI state subset in the first-part resource pool and the second-part resource pool by using a MAC-CE, where the third TCI state subset is used for downlink TCI state indication, and the fourth TCI state subset is used for uplink TCI state indication;

when the joint indication is performed based on the separate TCI state pool, performing joint indexing on the first-part resource pool and the second-part resource pool, and indicating or activating a fifth TCI state subset in the first-part resource pool and the second-part resource pool by using a MAC-CE, where the fifth TCI state subset is used for uplink state indication and downlink state indication; or performing separate indexing on the first-part resource pool and the second-part resource pool, and indicating or activating a sixth TCI state subset in the first-part resource pool and a seventh TCI state subset in the second-part resource pool by using a MAC-CE, where the sixth TCI state subset is used for downlink TCI state indication or activation, the seventh TCI state subset is used for uplink TCI state indication or activation, and the sixth TCI state subset and the seventh TCI state subset have a specified association relationship;

when the separate indication is performed based on the joint TCI state pool, indicating or activating each of two TCI state subsets in the joint TCI state pool by using one indication field of each of two MAC-CEs, where the two TCI state subsets are respectively used for downlink TCI state indication and uplink TCI state indication; or respectively indicating or activating two TCI state subsets in the joint TCI state pool by using two indication fields of one MAC-CE, where the two TCI state subsets are respectively used for downlink TCI state indication and uplink TCI state indication; and when the joint indication is performed based on the joint TCI state pool, indicating or activating each of two TCI state subsets in the joint TCI state pool by using one indication field of each of two MAC-CEs, where the two TCI state subsets are respectively used for downlink TCI state indication and uplink TCI state indication; or respectively indicating or activating two TCI state subsets in the joint TCI state pool by using two indication fields of one MAC-CE, where the two TCI state subsets are respectively used for downlink TCI state indication and uplink TCI state indication; or indicating or activating one TCI state subset in the joint TCI state pool by using one indication field of one MAC-CE, where the one TCI state subset is used for downlink TCI state indication and uplink TCI state indication.

In other words, in this implementation, the separate indication may be performed based on the separate TCI state pool, the joint indication may be performed based on the separate TCI state pool, the separate indication may be performed based on the joint TCI state pool, and the joint indication may be performed based on the joint TCI state pool.

Joint indexing is performed on the first-part resource pool and the second-part resource pool, and a MAC-CE is used to indicate or activate uplink and downlink. This manner uses separate TCI state pool joint indexing, and MAC-CE activation. In addition, separate indexing is performed on the first-part resource pool and the second-part resource pool, and a MAC-CE is used to indicate or activate uplink and downlink. This manner uses separate TCI state pool separate indexing, and MAC-CE joint activation.

For example, in the separate state pool joint indexing, a first part and a second part are spliced. If the first part is 128 states and the second part is 64 states, a range of the joint indexing is 1 to 128+64; and ranges of the separate indexing are 1 to 128 and 1 to 64. These are two representation methods. Assuming that one field is used for indication, the first 64 states of the field indicate two values, which are respectively used for uplink and downlink. In the second representation method, two fields, respectively including 128 states and 64 states, are used for separate indication, and are both in one piece of MAC-CE signaling.

The MAC-CE indication and the MAC-CE activation are two implementations.

The MAC-CE indication means that a MAC-CE selects one state from a TCI state pool as a unified TCI state.

The MAC-CE activation means that a MAC-CE selects N states from a TCI state pool as an activation set for DCI indication.

In a possible implementation, the performing separate or joint TCI state indication based on the unified TCI state includes at least one of the following:

explicitly performing separate or joint TCI state indication by using one indication field of radio resource control RRC or a MAC-CE;

explicitly performing separate or joint TCI state indication by using at least one indication field of a MAC-CE or downlink control information DCI; or implicitly performing separate or joint TCI state indication by using the unified TCI state pool, or a terminal beam correspondence capability, or a combination of the unified TCI state pool and the terminal beam correspondence capability.

In other words, in this implementation, for the separate or joint TCI state indication, there may be two manners: explicit indication and implicit indication.

The explicit indication uses explicit signaling, for example, RRC signaling, MAC-CE signaling, or DCI signaling.

The implicit indication uses a combination of a unified TCI state pool configured by using RRC, and a terminal beam correspondence capability.

For example, when a terminal reports that the beam correspondence capability is supported, and only a downlink TCI state pool is configured, a joint indication manner 1 is implicitly supported currently. The joint indication manner 1 is as follows: When DL and UL TCI states are jointly indicated, only the downlink TCI state pool may be used as a joint TCI state pool.

For another example, when a terminal reports that the beam correspondence capability is supported, and uplink and downlink TCI state pools are configured, a joint indication manner 2 is implicitly supported currently. The joint indication manner 2 is as follows: When DL and UL TCI states are jointly indicated, the downlink TCI state pool may be used in downlink, and the uplink TCI state pool may be used in uplink.

For another example, when a terminal reports that the beam correspondence capability is not supported or a non-ideal beam correspondence capability is supported, and uplink and downlink TCI state pools are configured, separate indication is implicitly supported currently. The separate indication is as follows: When DL and the UL TCI states are separately indicated, the downlink TCI state pool is used in downlink, and the uplink TCI state pool is used in uplink.

In a possible implementation, the performing separate or joint TCI state indication includes: performing TCI state indication under a specified condition, where the specified condition includes at least one of the following:

there is only an uplink TCI state;

there is only a downlink TCI state;

there is a same TCI state in uplink and downlink; or there are different TCI states in uplink and downlink.

In other words, in this implementation, beam indication may be implemented in four scenarios: there is only an uplink TCI state, there is only a downlink TCI state, there is a same TCI state in uplink and downlink, and there are different TCI states in uplink and downlink. An application scope of the beam indication is extended.

In a possible implementation, the performing separate or joint TCI state indication includes: performing separate or joint TCI state indication in one or more dimensions, where the plurality of dimensions include at least one of the following:

a plurality of carriers;

a plurality of target signals or channels;

a plurality of target transmission directions; or a plurality of terminals.

In other words, in this implementation, beam indication may be implemented in four dimensions: a plurality of carriers, a plurality of target signals or channels, a plurality of target transmission directions, and a plurality of terminals. An application scope of the beam indication is extended.

According to a second aspect, an embodiment of this application provides a beam indication apparatus, including:

an obtaining module, configured to obtain a unified transmission configuration indication TCI state pool, where the unified TCI state pool is used for a separate TCI state pool or a joint TCI state pool; and an indication module, configured to perform separate or joint TCI state indication based on the unified TCI state pool.

In a possible implementation, the unified TCI state pool includes a first-part resource pool and a second-part resource pool;

when the unified TCI state pool is used for the joint TCI state pool, at least one of the following is included:

the first-part resource pool is the joint TCI state pool, and the first-part resource pool is used for downlink transmission configuration indication TCI state indication or activation, and uplink TCI state indication or activation;

the second-part resource pool is the joint TCI state pool, and the second-part resource pool is used for downlink TCI state indication or activation, and uplink TCI state indication or activation; or the first-part resource pool and the second-part resource pool are the joint TCI state pool, and the first-part resource pool and the second-part resource pool are used for downlink TCI state indication or activation, and uplink TCI state indication or activation; and when the unified TCI state pool is used for the separate TCI state pool, the first-part resource pool is used for downlink TCI state indication or activation; and the second-part resource pool is or the first-part resource pool and the second-part resource pool are used for uplink TCI state indication or activation.

In a possible implementation, the first-part resource pool and the second-part resource pool include any one of the following:

the first-part resource pool includes a downlink TCI state, and the second-part resource pool includes an uplink TCI state;

the first-part resource pool includes a TCI state whose source reference signal is a downlink reference signal, and the second-part resource pool includes a TCI state whose source reference signal is an uplink reference signal; or the first-part resource pool includes a downlink TCI state, and the second-part resource pool includes an uplink TCI state that does not overlap the downlink TCI state, where the overlapping means that numbers or indexes of the TCI states are the same, or source reference signals of the TCI states are the same.

In a possible implementation, the TCI state whose source reference signal is a downlink reference signal includes at least one of the following:

a TCI state having a channel state information reference signal CSI-RS as the source reference signal;

a TCI state having a synchronization signal block SSB as the source reference signal; or a TCI state in which a downlink channel is used as a reference source, where the downlink channel includes one or more of a physical downlink control channel PDCCH, a physical downlink shared channel PDSCH, and a physical broadcast channel PBCH; and the TCI state whose source reference signal is an uplink reference signal includes at least one of the following:

a TCI state having a sounding reference signal SRS as the source reference signal; or a TCI state in which an uplink channel is used as a reference source, where the uplink channel includes one or more of a physical random access channel PRACH, a physical uplink control channel PUCCH, and a physical uplink shared channel PUSCH.

In a possible implementation, when a terminal has a reciprocity, the joint TCI state pool is the first-part resource pool, or the first-part resource pool and the second-part resource pool.

In a possible implementation, when a terminal has no reciprocity, the first-part resource pool is used for downlink TCI state indication or activation, and the second-part resource pool is used for uplink TCI state indication or activation.

In a possible implementation, the indication module includes:

a first indication submodule, configured to: when the separate indication is performed based on the separate TCI state pool, indicate or activate a first TCI state subset in the first-part resource pool and a second TCI state subset in the second-part resource pool by using a media access control-control element MAC-CE, where the first TCI state subset is used for downlink TCI state indication and the second TCI state subset is used for uplink TCI state indication; or indicate or activate a third TCI state subset in the first-part resource pool and a fourth TCI state subset in the first-part resource pool and the second-part resource pool by using a MAC-CE, where the third TCI state subset is used for downlink TCI state indication, and the fourth TCI state subset is used for uplink TCI state indication;

a second indication submodule, configured to: when the joint indication is performed based on the separate TCI state pool, perform joint indexing on the first-part resource pool and the second-part resource pool, and indicate or activate a fifth TCI state subset in the first-part resource pool and the second-part resource pool by using a MAC-CE, where the fifth TCI state subset is used for uplink state indication and downlink state indication; or perform separate indexing on the first-part resource pool and the second-part resource pool, and indicate or activate a sixth TCI state subset in the first-part resource pool and a seventh TCI state subset in the second-part resource pool by using a MAC-CE, where the sixth TCI state subset is used for downlink TCI state indication or activation, the seventh TCI state subset is used for uplink TCI state indication or activation, and the sixth TCI state subset and the seventh TCI state subset have a specified association relationship;

a third indication submodule, configured to: when the separate indication is performed based on the joint TCI state pool, indicate or activate each of two TCI state subsets in the joint TCI state pool by using one indication field of each of two MAC-CEs, where the two TCI state subsets are respectively used for downlink TCI state indication and uplink TCI state indication; or respectively indicate or activate two TCI state subsets in the joint TCI state pool by using two indication fields of one MAC-CE, where the two TCI state subsets are respectively used for downlink TCI state indication and uplink TCI state indication; and a fourth indication submodule, configured to: when the joint indication is performed based on the joint TCI state pool, indicate or activate each of two TCI state subsets in the joint TCI state pool by using one indication field of each of two MAC-CEs, where the two TCI state subsets are respectively used for downlink TCI state indication and uplink TCI state indication; or respectively indicate or activate two TCI state subsets in the joint TCI state pool by using two indication fields of one MAC-CE, where the two TCI state subsets are respectively used for downlink TCI state indication and uplink TCI state indication; or indicate or activate one TCI state subset in the joint TCI state pool by using one indication field of one MAC-CE, where the one TCI state subset is used for downlink TCI state indication and uplink TCI state indication.

In a possible implementation, the indication module includes at least one of the following:

a fifth indication submodule, configured to explicitly perform separate or joint TCI state indication by using one indication field of radio resource control RRC or a MAC-CE;

a sixth indication submodule, configured to explicitly perform separate or joint TCI state indication by using at least one indication field of a MAC-CE or downlink control information DCI; or a seventh indication submodule, configured to implicitly perform separate or joint TCI state indication by using the unified TCI state pool, or a terminal beam correspondence capability, or a combination of the unified TCI state pool and the terminal beam correspondence capability.

In a possible implementation, the indication module includes:

an eighth indication submodule, configured to perform separate or joint TCI state indication, including: performing TCI state indication under a specified condition, where the specified condition includes at least one of the following:

there is only an uplink TCI state;

there is only a downlink TCI state;

there is a same TCI state in uplink and downlink; or there are different TCI states in uplink and downlink.

In a possible implementation, the indication module includes:

a ninth indication submodule, configured to perform separate or joint TCI state indication in one or more dimensions, where the plurality of dimensions include at least one of the following:

a plurality of carriers;

a plurality of target signals or channels;

a plurality of target transmission directions; or a plurality of terminals.

According to a third aspect, an embodiment of this application provides a beam indication apparatus, including a processor, a memory, and a transceiver, where the memory is configured to store computer instructions; and when the beam indication apparatus runs, the processor executes the computer instructions, to enable the beam indication apparatus to perform the method according to the first aspect.

According to a fourth aspect, an embodiment of this application provides a computer storage medium. The computer storage medium includes computer instructions, and when the computer instructions are run, the method according to the first aspect is performed.

According to a fifth aspect, an embodiment of this application provides a computer program product. The computer program product includes computer instructions, and when the computer instructions are run, the method according to the first aspect is performed.

According to a sixth aspect, an embodiment of this application provides a terminal, where the terminal is configured to perform the method according to the first aspect.

Embodiments of this application provide a beam indication method and apparatus, and a terminal, to implement separate and joint TCI state pools and separate and joint TCI state indication by using a loose TCI state pool design, so that signaling overheads and a delay of beam indication are reduced. A loose TCI state pool is applicable to both separate indication and joint indication. One TCI state pool may be used in downlink, or may be used in uplink and downlink.

BRIEF DESCRIPTION OF THE DRAWINGS

FIG. 7 is a schematic diagram of a MAC-CE according to an embodiment of this application;

FIG. 8 is a schematic diagram of a MAC-CE according to an embodiment of this application;

FIG. 9 is a schematic diagram of a MAC-CE according to an embodiment of this application;

FIG. 10 is a schematic diagram of a MAC-CE according to an embodiment of this application;

DETAILED DESCRIPTION OF ILLUSTRATIVE EMBODIMENTS

Figure 1:
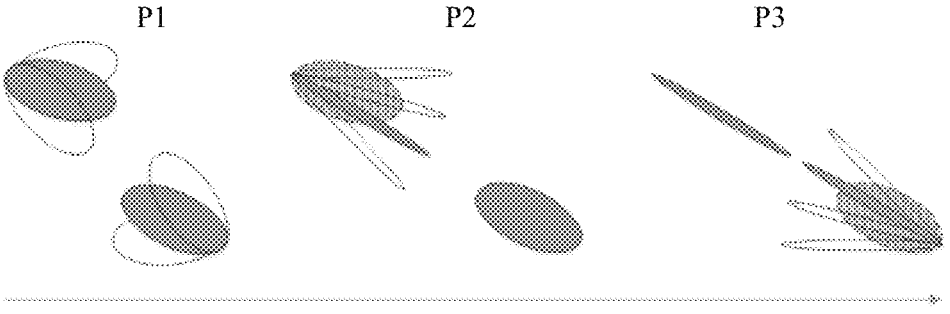
FIG. 1 is a schematic diagram of a downlink beam training process.

The following describes technical solutions of embodiments in this application with reference to accompanying drawings. It is clear that the described embodiments are merely some but not all of embodiments of this application.

In the descriptions of this specification, "an embodiment", "some embodiments", or the like indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise especially emphasized in another manner.

In the descriptions of this specification, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions in embodiments of this application, "a plurality of" means two or more.

In the descriptions of this specification, the terms "first" and "second" are merely intended for description, and shall not be understood as an indication or implication of relative importance or implicit indication of a quantity of indicated technical features. Therefore, a feature limited by "first" or "second" may explicitly or implicitly include one or more features. The terms "include", "contain", "have", and their variants all mean "include but are not limited to", unless otherwise especially emphasized in another manner.

The following first describes key technologies in embodiments of this application.

To meet requirements of three scenarios, compared with 4G LTE that uses a low frequency band, 5G NR uses a newly added high frequency band (usually considered to be 6G or later), for example, a 28 GHz, 39 GHz, or 60 GHz frequency band. A higher bandwidth and a higher transmission rate are achieved by introducing a high frequency. Because the frequency is high, a signal may severely fade during propagation in space. Therefore, 5G NR uses a BF technology to obtain a good directional gain, so that directional power in a transmit direction is increased, an SINR at a receiving end is improved, and system performance is improved. In a 5G NR research process, a tradeoff between costs and performance is considered, and an HBF technology including digital beamforming and analog beamforming is finally used. In an implementation process of the beamforming technology, an antenna panel is a core component, and a beam is sent or received through the antenna panel. In 5G NR deployment and implementation, a directional beam is used. To meet wide-area coverage, a base station and a terminal are both deployed using a plurality of antenna panels. Especially, for the terminal, to meet coverage and in a case of limited space and cost saving, antenna panel deployment has more important impact on performance.

Because both of the base station and the terminal use the hybrid beamforming technology, a transmit beam and receive beam management problem consequently caused becomes a central problem in a 5G NR standardization discussion process. After a plurality of times of discussion, in the first release 3GPP Rel-15 of 5G NR, beam management content is finally standardized, and a beam management framework is further standardized, including beam training, beam measurement and reporting, beam indication that is for signals or channels, and the like.

The beam training content includes a receive beam and transmit beam sweeping process of the base station and the terminal, and this aims to find a beam pair, which includes a transmit beam and a receive beam. A gain of a received signal is optimal only when directions of the transmit beam and the receive beam are aligned.

1. Downlink Beam Training Process, as Shown in FIG. 1

Process P1 (Rough Alignment):

A gNB covers an area in a transmit beam sweeping manner. A UE separately performs pairing with a transmit beam of the gNB in a receive beam sweeping manner, and performs measurement and reporting. The gNB and the UE select one or more appropriate beams (pairs) as an initial selection. To accelerate the process P1, the gNB and the UE usually select coarse beam sweeping. The process P1 is not definitely described in a protocol.

Process P2 (Finely Adjusting the Transmit Beam of the gNB):

The gNB performs fine transmit beam sweeping based on the initial transmit beam obtained in the process P1. The UE performs pairing, measurement, and reporting based on the initial receive beam obtained in the process P1 (or in a manner of indicating the beam by the base station), to train a fine transmit beam of the gNB. For this process, only identification (Repetition=OFF) of the process P2 is described in the protocol. For another configuration and process, main control is implemented by the gNB.

Process P3 (Finely Adjusting a Receive Beam of the UE):

Based on the process P2, the gNB obtains the fine transmit beam through training, to perform same beam transmission. The UE obtains a coarse beam through the process P2, to perform fine receive beam sweeping, and performs pairing and measurement, to train a fine receive beam of the UE. For this process, only identification (Repetition=ON) of the process P3 is described in the protocol. Other configurations and processes are implemented by the gNodeB.

It should be noted that the foregoing Repetition may be understood as repeated beam sending.

2. Uplink Beam Training Process (Similar to the Downlink Beam Training Process)

Process U1 (Rough Alignment):

A UE covers an area in a transmit beam sweeping manner. A gNB separately performs pairing with a transmit beam of the UE in a receive beam sweeping manner, and performs measurement. The gNB and the UE select one or more appropriate beams (pairs) as an initial selection. To accelerate the process U1, the gNB and the UE usually select coarse beam sweeping. The process U1 is not definitely described in the protocol.

Process U2 (Finely Adjusting a Receive Beam of the gNB):

The UE performs same beam transmission based on a transmit beam configured by the base station. The gNB performs fine receive beam sweeping based on the initial receive beam obtained in the process U1, performs pairing and measurement, and selects an appropriate fine receive beam. This process is not definitely described in the protocol. The gNB implements main control. It is agreed that a process performed when the gNB configures a same transmit beam for different reference signals of the UE may be considered as the process U2.

Process U3 (Finely Adjusting the Transmit Beam of the UE):

The UE performs fine transmit beam sweeping based on a transmit beam configured by the base station. The gNB performs pairing and measurement based on the receive beam obtained in the process U2, and selects an appropriate fine receive beam of the UE. This process is not definitely described in the protocol. The gNB implements main control. It is agreed that a process performed when the gNB configures different transmit beams for different reference signals of the UE may be considered as the process U3.

In the foregoing process, when Repetition is configured to be 'ON' for a CSI-RS (channel state information reference signal), the terminal assumes that transmit beams of the base station are the same for all CSI-RSs in a CSI-RS set. When Repetition is configured to be 'OFF' for a CSI-RS, the terminal does not assume that transmit beams of the base station are the same for all CSI-RSs in a CSI-RS set.

For the beam training process, the terminal needs to measure and report a measurement reference signal configured by the base station. According to the protocol, L1-RSRP (Layer 1 reference signal received power) measurement metrics is used to measure beam quality, and L1-SINR (Layer 1 signal to interference plus noise ratio) measurement metrics is used to measure the beam quality. In comparison with the L1-RSRP, for the L1-SINR, impact of interference on the beam quality may be further considered.

The terminal may find, by using the foregoing beam training process, a beam pair for communicating with the base station. In the current protocol, a beam pair relationship is implicitly represented by using a QCL (quasi co-located) relationship. QCL is introduced from LTE, to simplify implementation of a terminal in a CoMP (coordinated multipoint) scenario. Currently, NR still inherits use of the LTE QCL relationship, and further extends the LTE QCL relationship. A QCL relationship currently defined in Rel-15 NR is described in the 3GPP protocol 38.211 as follows: "For two antenna ports, a large-scale channel characteristic of one port may be deduced from the other port, and it may be considered that the two antenna ports have a QCL relationship. The large-scale channel characteristic may be delay spread, an average delay, a Doppler frequency shift, Doppler spread, an average gain, a receive beam spatial parameter, or the like." Currently, the QCL relationship is classified as follows:

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

Further, the QCL relationship may be further encapsulated into an RRC (radio resource control) parameter, and a TCI-state and a Spatial Relation are used by uplink and downlink signals or channels. QCL-TypeD is an implicit beam pair relationship. The terminal provides a beam reference for a corresponding signal or channel by using the foregoing beam training process and the QCL relationship.

It should be noted that the beam training process, also referred to as a beam tracking and maintenance process, relates to beam measurement and reporting. The current protocol supports tracking of a maximum of N beams, where N depends on a terminal capability. Periodic, semi-persistent, and aperiodic measurement and reporting based on an SSB (synchronization signal block) or a CSI-RS (channel state information reference signal) are supported. A maximum quantity of measurement times reported at a time does not exceed 64. Non-group-based reporting and group-based reporting are supported. A maximum of four beams are reported at a time for the non-group-based reporting, and a maximum of two pairs of beams are reported at a time for the group-based reporting. Usually, both a coarse beam and a fine beam need to be measured.

3. Beam Indication

Uplink and downlink signals or channels specified in the protocol may perform beam indication by using a QCL relationship (TCI-state/Spatial Relation). The uplink and downlink beam indication may be signaling explicit indication, or may be default beam reference implicit indication specified in the protocol.

For the signaling explicit indication, a downlink overall beam pool is defined in a PDSCH (physical downlink shared channel)-Config IE (configuration unit). Beam pools of other signals or channels are subsets obtained from the PDSCH-Config IE, and are respectively defined in IEs of the corresponding channels or signals. For example, a beam pool of a PDCCH (physical downlink control channel) is defined in a CORESET (control-resource set) IE, and is a subset of a beam pool in the PDSCH-Config IE; a beam pool of a P-CSI-RS (periodic channel state information reference signal) is configured in an NZP resource IE (namely, an NZP resource configuration element); a beam pool of an SP (semi-persistent)-CSI-RS is configured in the PDSCH-Config IE; and a beam pool of an AP (access point)-CSI-RS is configured in a CSI-AperiodicTriggerStateList (aperiodic trigger state list) IE.

Figure 2:
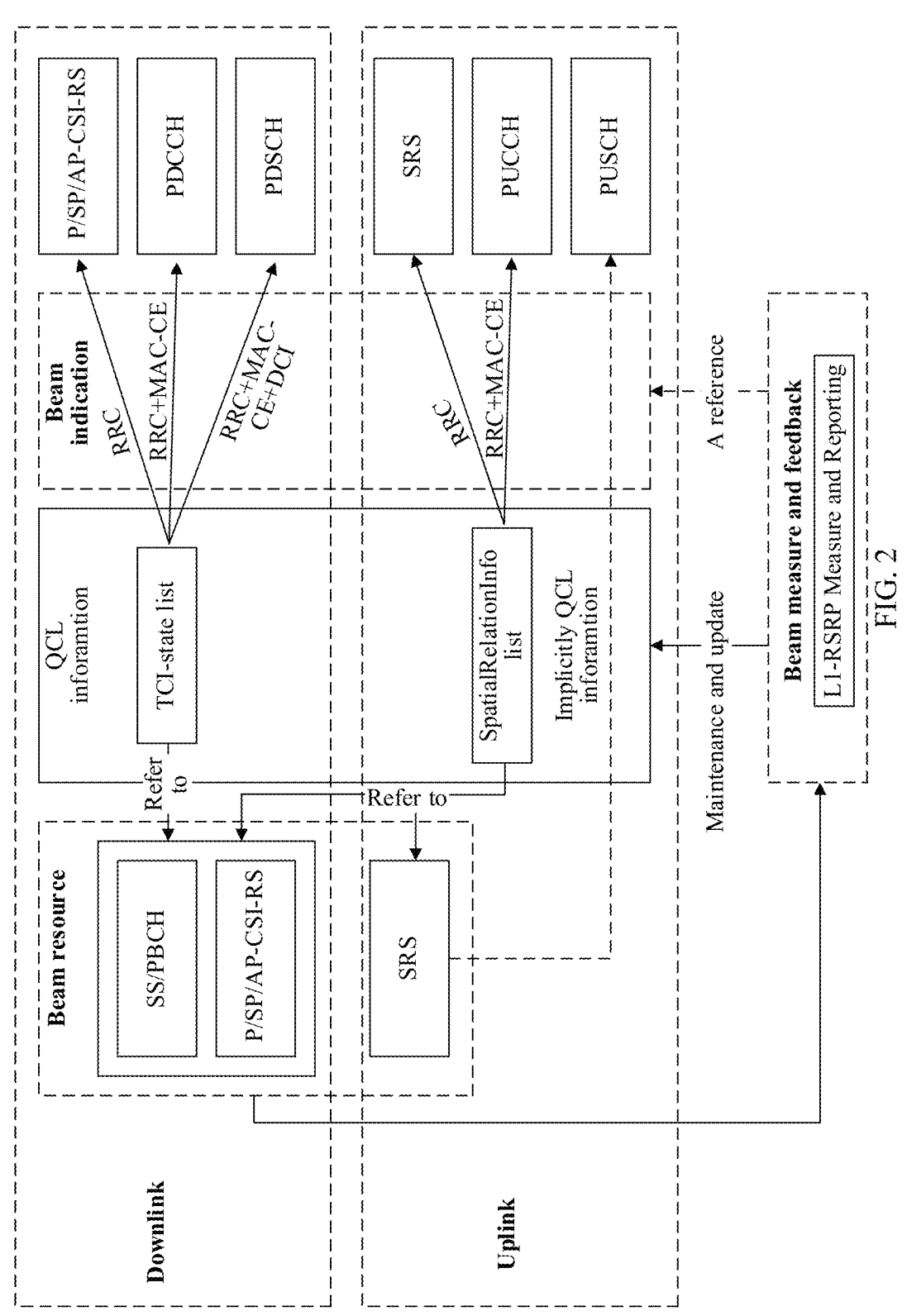
FIG. 2 is a schematic diagram of beam maintenance, tracking, and indication.

No uplink overall beam pool is defined in the protocol, and uplink beam pools are respectively defined in corresponding signals or channels. For example, a beam pool of a PUCCH (physical uplink control channel) is defined in a PUCCH-config IE; a beam pool of a P/AP-SRS (sounding reference signal) is configured in an SRS-resource IE; and a beam pool of an SP-SRS is indicated by a MAC-CE (media access control-control element). A beam indication signaling architecture is shown in FIG. 2.

3. Explicit Manner of Beam Indication

PDSCH: A three-level signaling indication structure of RRC+MAC-CE+DCI (downlink control information) is used. A beam resource pool is configured by using higher layer RRC signaling, and a beam subset including a plurality of beams is activated by using MAC-CE signaling. Finally, one beam of the beam subset is triggered by using DCI, to indicate a PDSCH beam.

PDCCH: A two-level signaling indication structure of RRC+MAC-CE is used. A beam resource pool is configured by using higher layer RRC signaling, and one beam thereof is activated by using MAC-CE signaling, to indicate a PDCCH beam.

CSI-RS: For a periodic CSI-RS, a beam is configured by using RRC. A semi-persistent CSI-RS beam is configured by using RRC and indicated by using a MAC-CE. An aperiodic CSI-RS beam is configured by using RRC, may be updated and activated by using a MAC-CE, and is indicated through DCI triggering.

PUCCH: For PUCCH beam indication, a beam resource pool is configured by using higher layer RRC signaling, and one beam thereof is activated by using MAC-CE signaling, to indicate a PUCCH beam.

PUSCH: PUSCH beam indication is performed by using an SRS beam indicated by an SRI (sounding reference signal resource indicator) associated with the PUSCH.

SRS: For a periodic SRS, a beam is configured by using RRC. A semi-persistent SRS beam is configured by using RRC and indicated by using a MAC-CE. An aperiodic SRS beam is configured by using RRC, may be updated and activated by using a MAC-CE, and is indicated through DCI triggering.

For current explicit beam indication signaling, each CC (component carrier, carrier) is based on three-level indication of RRC+MAC-CE+DCI, a target signal or channel is separately indicated, a target transmission direction DL (downlink) or UL (uplink) is separately indicated, and each UE is separately indicated.

4. Implicit Manner of Beam Indication

PDSCH:

Case (instance) #1: There is a QCL relationship between a common (usual) PDSCH and an SSB associated with decoded system information.

Case #2: After receiving an RRC initial configuration and before activating beam (MAC-CE) signaling, the terminal assumes that there is a QCL relationship between the PDSCH and an SSB used for initial access. Herein, a QCL type is Type-A and Type-D.

Case #3: If a TCI enable field of the PDSCH in DCI is not enabled, there is a QCL relationship between the PDSCH and a PDCCH that is for scheduling the PDSCH. Herein, a QCL type is Type-A/B/C/D.

Case #4: If a TCI enable field of the PDSCH in DCI is enabled, when a scheduling offset of the PDSCH is less than a scheduling threshold, the PDSCH has a QCL relationship with a PDCCH with a smallest CORESET ID (identifier) in a latest slot in which PDCCH monitoring exists in an active BWP (bandwidth part) of a serving cell. Herein, a QCL type is Type-A/B/C/D. In a multi-TRP (transmission and reception point) scenario, associated CORESETs need to be limited to be within a same TRP.

Case #5: In a multi-TRP scenario, if an RRC configuration of the PDSCH includes at least one configuration having two TCI indications, when a current scheduling offset of the PDSCH is less than a scheduling threshold, the PDSCH uses a configuration having a smallest ID and having two TCI indications.

Case #6: In a cross-carrier scheduling scenario, when a TCI enable field of the PDSCH in DCI is enabled, and a scheduling offset of the PDSCH is less than a scheduling threshold, it is assumed that the PDSCH on a scheduled carrier has a QCL relationship with an activated TCI state with a smallest ID.

PDCCH:

Case #1: There is a QCL relationship between a common PDCCH and an SSB associated with decoded system information.

Case #2: For a non-ID #0 CORESET, if no TCI-state is configured, or a plurality of TCI-states are configured for initial RRC, and a MAC-CE is not activated, the PDCCH has a QCL relationship with an SSB for initial access.

Case #3: For a non-ID #0 CORESET, if a plurality of TCI-states are configured for RRC in an HO (handover) or SCell (secondary serving cell) addition process, and a MAC-CE is not activated, the PDCCH has a QCL relationship with an SSB for random access initiated in the process.

Case #4: For an ID #0 CORESET, if no TCI-state is configured, or a plurality of TCI-states are configured for initial RRC, and a MAC-CE is not activated, the PDCCH has a QCL relationship with an SSB for initial access.

CSI-RS:

No default beam is defined for periodic and semi-persistent CSI-RSs. For an aperiodic CSI-RS beam, when a scheduling offset is less than a scheduling threshold, if there is another channel or signal indicating a beam on a same symbol, the beam of the another channel or signal is used; or if there is no other channel or signal indicating a beam on a same symbol, the CSI-RS has a QCL relationship with a PDCCH with a smallest CORESET ID in a slot that has PDCCH monitoring and that is closest to an active BWP of a serving cell.

PUCCH:

Case #1: If no PL-RS is configured, no uplink beam is configured, and a default beam is configured, beam reference is performed on a beam of a CORESET with a smallest ID in an active BWP of a PCell.

PUSCH:

Case #1: When the PUSCH is scheduled by using DCI 0_0, beam reference is performed on a beam of a PUCCH that has a smallest ID and that is dedicated to an active BWP of the CC.

Case #2: When the PUSCH is scheduled by using DCI 0_0, and a default beam function is enabled, if no PUCCH is configured in an active uplink BWP in connected mode, beam reference is performed on a beam of a CORESET with a smallest ID in an active BWP of the CC.

Case #3: When the PUSCH is scheduled by using DCI 0_0, and a default beam function is enabled, if the configured PUCCH has no beam reference, beam reference is performed on a beam of a CORESET with a smallest ID in an active BWP of the CC.

However, the foregoing beam indication has the following technical problems:

For the explicit indication, the three-level signaling structure is complex and a delay is long.

For the explicit indication, each UE is separately indicated, each signal and channel are separately indicated, DL or UL is separately indicated, and system overheads are large.

For the implicit indication, although signaling is saved, a rollback to an initial access beam occurs in more scenarios. As a result, a reference beam cannot be well matched, and system performance deteriorates.

For the implicit indication, although a PDC/PDS/CSI-RS beam may be updated in a unified manner, a current signaling structure is not flexible enough.

To reduce signaling overheads and a delay of beam indication, and also consider an actual scenario, in most cases, a plurality of signals or channels use a same beam. Therefore, a separate TCI state pool design, a joint TCI state pool design, separate TCI state indication, and joint TCI state indication are generally needed.

Figure 3:
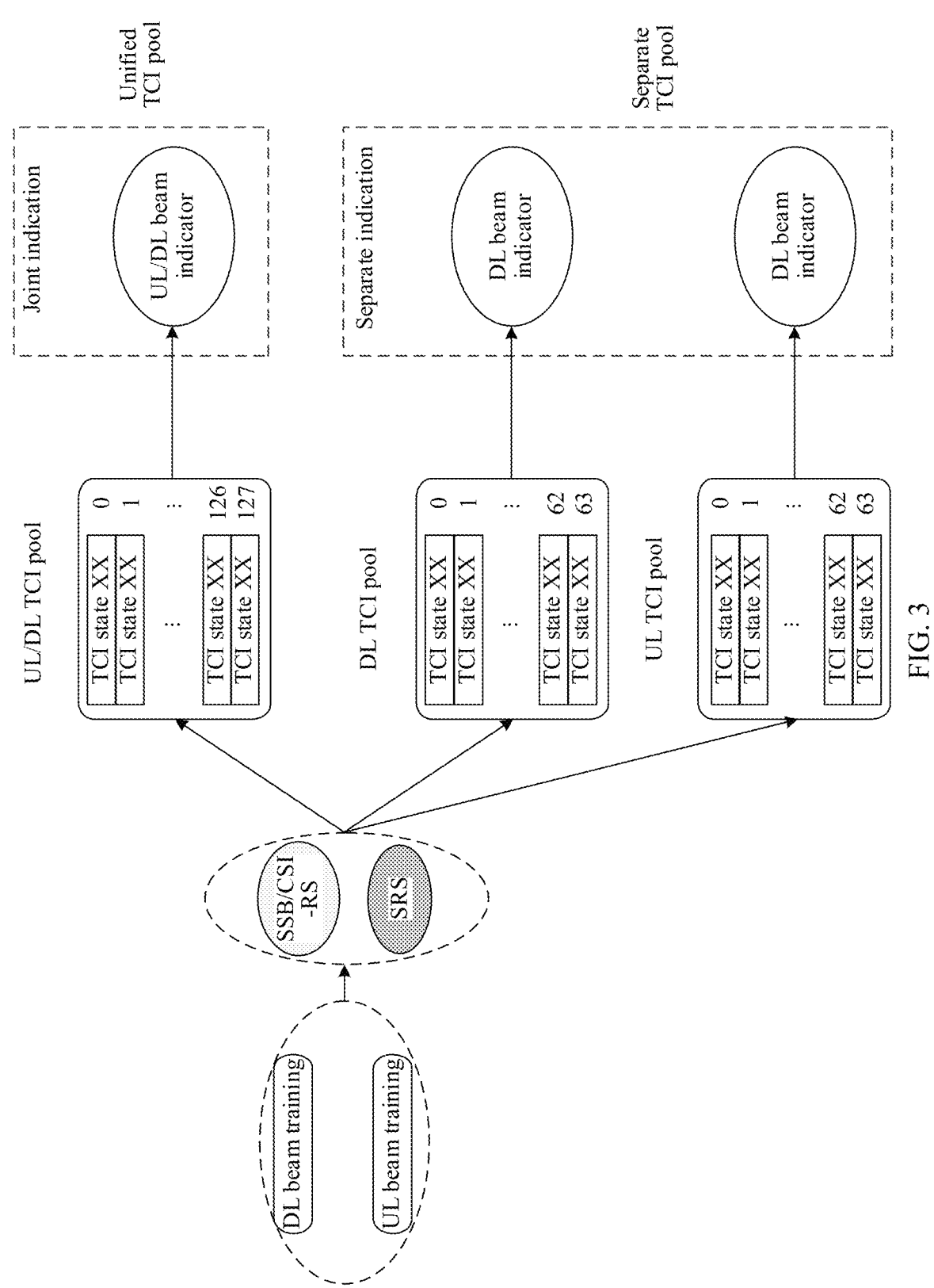
FIG. 3 is a schematic diagram of a beam indication process.

A first solution is shown in FIG. 3.

(1) for a Separate TCI State Pool, Implementation May be in the Following Manners:

Manner 1: An existing downlink TCI state pool is reused in downlink; the existing downlink TCI state pool is reused as an uplink TCI state pool; and separate indexing is performed.

The separate indexing means that although the downlink TCI state pool and the uplink TCI state pool share one TCI state pool, uplink indication and downlink indication are performed separately, and do not interfere with each other.

Manner 2: An existing downlink TCI state pool is reused in downlink; and an uplink TCI state pool is newly created, including a downlink RS (reference signal) resource.

Manner 3: An existing downlink TCI state pool is reused in downlink; and an existing uplink pool including spatial relationships (spatial relations) is reused as an uplink TCI state pool.

However, the foregoing manner 1 requires a reciprocity, cannot be used in a scenario with no reciprocity, and lacks SRS based TCI state indication. In the foregoing manner 2 and manner 3, a TCI state that is the same as that in the downlink TCI state pool may exist, and a resource waste occurs. For example, it is assumed that based on a scenario with a reciprocity, a TCI state is based on a CSI-RS #1, a spatial relation is also based on the CSI-RS #1, and indication of the two is both referring to a beam of the CSI-RS #1 in essence. If the CSI-RS #1 separately exists in the TCI state and the spatial relation, the terminal needs to perform storage and maintenance twice, and this is actually unnecessary.

It should be noted that, the reciprocity is mainly a beam correspondence, and may be extended to a channel reciprocity. The beam correspondence of the terminal means that transmit and receive beams of the terminal are the same or point to a same direction.

(2) for a Joint TCI State Pool, Implementation May be in the Following Manners:

Manner 1: An existing downlink TCI state pool is reused; and joint indexing is performed.

The joint indexing has two meanings. Uplink and downlink can be indicated by using same signaling. In the same signaling, there may be only one field used to indicate uplink and downlink at the same time. In the same signaling, there may be two fields, one is used to indicate uplink, and the other is used to indicate downlink. Uplink and downlink may be indicated at the same time.

Manner 2: A joint TCI state pool is newly created, including an uplink TCI state and a downlink TCI state. The uplink TCI state and the downlink TCI state may have different content, and the uplink TCI state may include an SRS or another uplink parameter. The another parameter may be a parameter such as PC (power control) and TA (timing advance).

Manner 3: A joint TCI state pool is extended or newly created, including an existing downlink TCI state pool and all uplink spatial relations.

However, the foregoing manner 1 requires a reciprocity, cannot be used in a scenario with no reciprocity, and lacks SRS based TCI state indication. In the foregoing manner 2 and manner 3, a same TCI state may exist in uplink and downlink TCI states, and a resource waste occurs.

(3) for the Separate TCI State Indication

Based on a Separate TCI State Pool

Uplink: A MAC-CE and/or DCI are/is used, and reference is made to an uplink TCI state pool.

Downlink: A MAC-CE and/or DCI are/is used, and reference is made to a downlink TCI state pool.

Based on a Joint TCI State Pool

Manner 1: Uplink or downlink: Separate MAC-CEs and/or separate DCI are/is used, and reference is made to a joint TCI state pool.

Manner 2: Uplink or downlink: A same MAC-CE and/or same DCI are/is used, reference is made to a joint TCI state pool, and a flag bit is used for distinguishing.

(4) for the Joint TCI State Indication

Based on a Joint TCI State Pool

A same MAC-CE and/or same DCI are/is used, and reference is made to a joint pool.

Therefore, to resolve the foregoing technical problems and further reduce the signaling overheads and the delay of the beam indication, this application provides a beam indication method and apparatus, and a terminal, to implement separate and joint TCI state pools and separate and joint TCI state indication by using a loose TCI state pool design.

A loose TCI state pool is applicable to both separate indication and joint indication. One TCI state pool may be used in downlink, or may be used in uplink and downlink.

It should be noted that, a DL/an UL TCI state has been specified in the protocol, where the DL TCI state is used for at least downlink TCI state indication, and the UL TCI state is used for at least uplink TCI state indication. However, for a DL/an UL TCI state pool, the protocol does not specify that the DL TCI state pool definitely includes the DL TCI state and the UL TCI state pool definitely includes the UL TCI state. Alternatively, from another perspective, the DL TCI state is not necessarily used only in downlink, and may also be used in uplink. In addition, a concept of a TCI state pool cannot be embodied in the protocol.

Descriptions are provided below by using specific embodiments.

Figure 4:
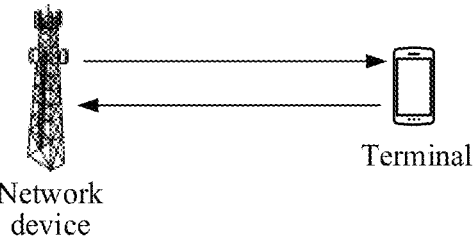
FIG. 4 is a schematic diagram of a communication system.

FIG. 4 is a schematic diagram of a communication system. As shown in FIG. 4, the communication system includes a network device and a terminal.

A terminal in this application is also referred to as a UE, an MS (mobile station), an MT (mobile terminal), or the like, and refers to a device that provides a user with voice and/or data connectivity, for example, a handheld device or a vehicle-mounted device that has a wireless connection function. Currently, some examples of terminals are a mobile phone, a tablet computer, a notebook computer, a palmtop computer, a MID (mobile internet device), a wearable device, a VR (virtual reality) device, an AR (augmented reality) device, a wireless terminal in industrial control, a wireless terminal in self driving, a wireless terminal in remote surgery (remote medical surgery), and a wireless terminal in a smart grid, a wireless terminal in transportation safety, a wireless terminal in a smart city, a wireless terminal in a smart home, and the like.

A network device in this application is a RAN (radio access network) node or a RAN device that connects the terminal to a wireless network, and may also be referred to as a base station. Currently, some examples of RAN nodes are a gNB (next generation NodeB), a TRP (transmission reception point), an eNB (evolved NodeB), an RNC (radio network controller), an NB (NodeB), a BSC (base station controller), a BTS (base transceiver station), a home NodeB (for example, home evolved NodeB, or home NodeB, HNB), a BBU (baseband unit), a wireless fidelity (Wi-Fi) access point (AP), and the like.

To reduce signaling overheads and a delay of beam indication, a unified TCI framework and common beam indication are used in this application. Herein, "unified" and "common" may be understood as having a same TCI state in one or more of the following dimensions:

(1) a plurality of CCs;

(2) a plurality of target signals or channels;

(3) a plurality of target transmission directions, namely, DL or UL; or (4) a plurality of UEs.

In this application, beam indication is performed in one or more of the following scenarios:

(1) there is only an uplink TCI state (DL-only TCI state);

(2) there is only a downlink TCI state (UL-only TCI state);

(3) there is a same TCI state in uplink and downlink (DL+UL with same TCI state ID); or (4) there are different TCI states in uplink and downlink (DL+UL with different TCI state ID).

1. TCI State Pool Design

A TCI state pool is divided into two pails: a first part and a second part. The first part and the second part may each be used for uplink and downlink beam pools.

(1) Implementation 1: The first part may include a downlink TCI state, and the second part may include an uplink TCI state (this is an existing solution, and is used for a subsequent indication solution).

(2) Implementation 2: The first part may include a TCI state whose source reference signal is a downlink reference signal (an SSB/a CSI-RS), and the second part may include a TCI state whose source reference signal is an uplink reference signal (an SRS).

(3) Implementation 3: The first part may include all downlink TCI states (including a part that overlaps with an uplink TCI state), and the second part includes an uplink TCI state that does not overlap with the downlink TCI state. The overlapping means that numbers or indexes of the TCI states are the same.

The foregoing may be independently configured by using RRC or a MAC-CE or jointly configured.

Figure 5:
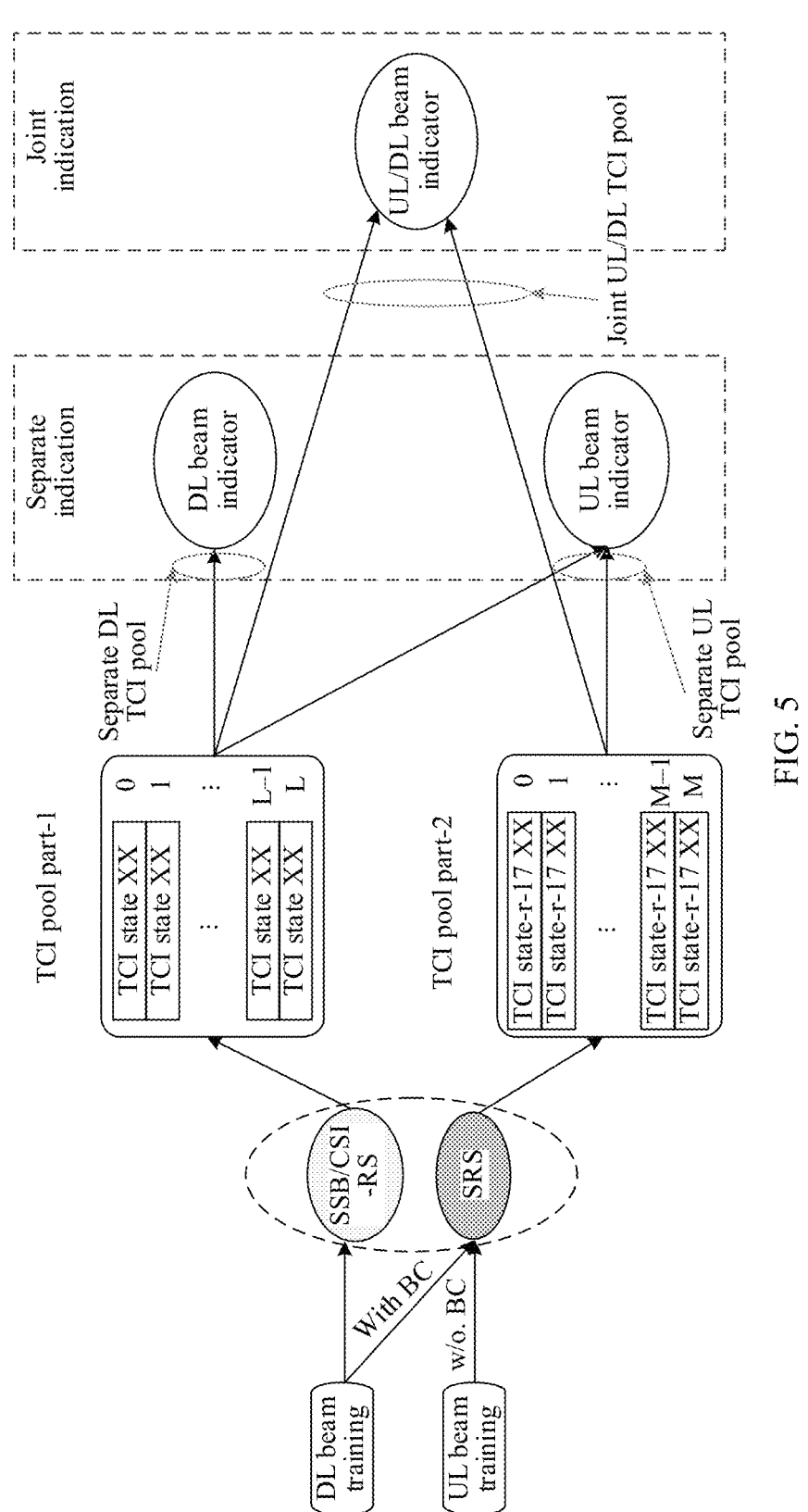
FIG. 5 is a schematic diagram of a beam indication process according to an embodiment of this application.

As shown in FIG. 5, based on the implementation 1 or the implementation 2, for the first part (namely, a TCI pool part-1 in FIG. 5), an existing downlink TCI state pool, namely, a TCI state list configured by using PDSCH-config, may be reused; or a downlink TCI state pool may be newly created. In addition, in FIG. 5, "with BC" represents that there is a reciprocity, and "w/o BC", namely, "without BC", represents that there is no reciprocity. If there is the reciprocity, a beam may be trained for an SRS through downlink beam training, and then another channel or signal is indicated by using the beam of the SRS. Similarly, if there is no reciprocity, a beam may be trained for an SRS only through uplink beam training.

Further, in the foregoing TCI states, an uplink parameter may be added, for example, a parameter such as PC or TA, but is used only for indicating the uplink TCI state.

In addition, for the foregoing implementations, corresponding use manners may include:

(1) Use manner 1: For use of a joint TCI state pool, the first part plus the second part may be used, or only the first part is used, or only the second part is used.

When there is a terminal reciprocity, the first part plus the second part may be used, or only the first part is used.

When there is no terminal reciprocity or there is a base station reciprocity, only the second part is used.

In another case, the first part plus the second part may be used.

(2) Use manner 2: For use of a separate TCI state pool, for a downlink TCI state pool, the first part is used; and for an uplink TCI state pool, the first part plus the second part are used, or only the second part is used.

When the uplink TCI state pool is used, whether there is an uplink and downlink reciprocity may be considered. If there is the reciprocity, the first part plus the second part are used; or if there is no uplink and downlink reciprocity, only the second part is used.

2. TCI State Indication Design (1) Indication manner 1: When separate indication is performed based on a separate TCI state pool, only N TCI states in the first part may be activated by using a MAC-CE, to perform downlink indication; or N TCI states in each of the first part and the second part may be activated by using a MAC-CE, to perform uplink indication with a reciprocity; or N TCI states in the second part may be activated by using a MAC-CE, to perform uplink indication without a reciprocity.

(2) Indication manner 2: When joint indication is performed based on a separate TCI state pool, separate TCI state pool joint indexing may be used, and MAC-CE activation may be used; or separate TCI state pool separate indexing may be used, and MAC-CE joint activation may be used.

(3) Indication manner 3: When separate indication is performed based on a joint TCI state pool, MAC-CE separate activation may be used.

(4) Indication manner 4: When joint indication is performed based on a joint TCI state pool, MAC-CE joint activation may be used.

(5) Indication manner 5: RRC/a MAC-CE indicates separate or joint indication by using one indication field.

(6) Indication manner 6: A combination of a TCI state pool and a UE capability configured by using RRC is used, to implicitly obtain separate or joint indication, namely, indication of the following scenario:

there is only an uplink TCI state (DL-only TCI state);
there is only a downlink TCI state (UL-only TCI state);
there is a same TCI state in uplink and downlink (DL+UL with same TCI state ID); or
there are different TCI states in uplink and downlink (DL+UL with different TCI state ID).

For example, the scenario may be MPE mitigation (maximum permitted radiation power removal), UE power saving (terminal power saving), UL interference management, Support different configurations across panels, or UL (uplink) mTRP (multi-TRP).

Figure 6:
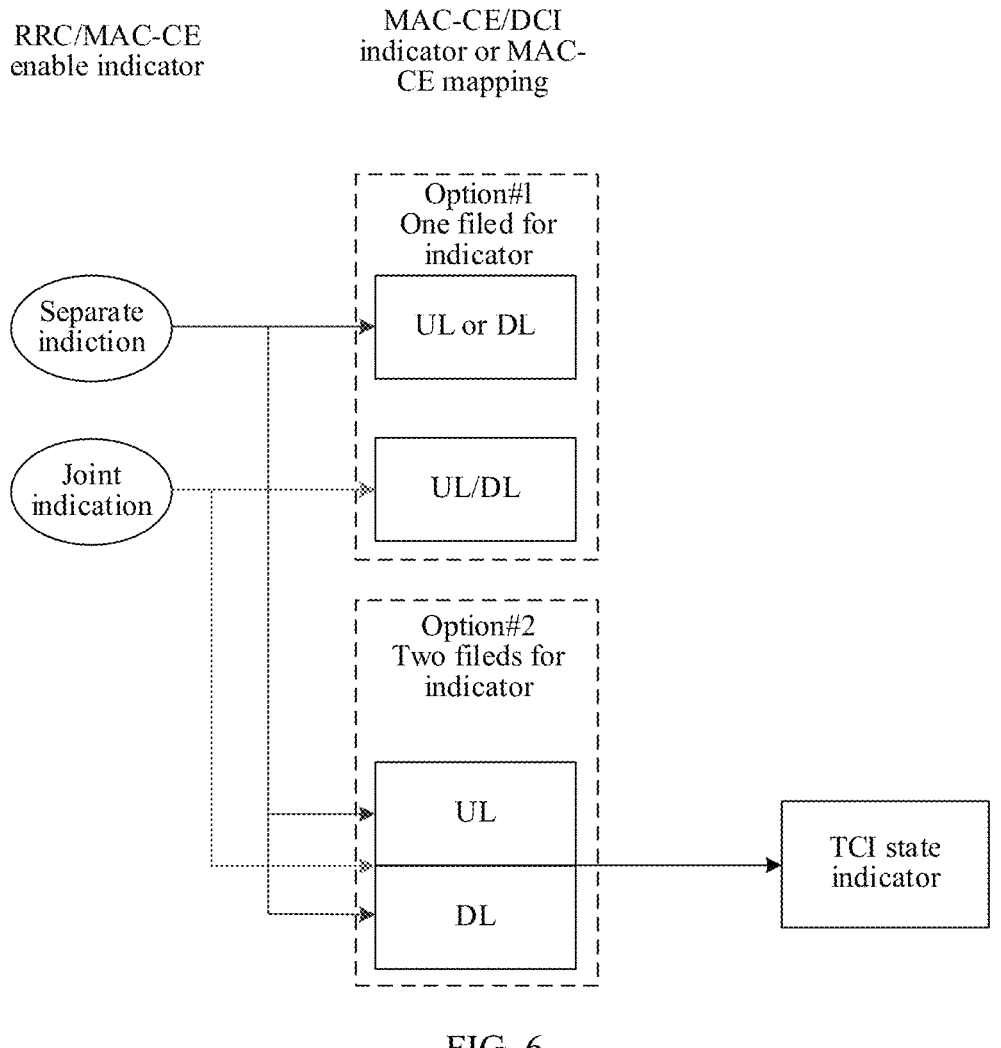
FIG. 6 is a schematic diagram of a beam indication manner according to an embodiment of this application.

(8) Indication manner 7: A MAC-CE or DCI indicates uplink and downlink by using one indication field or two indication fields. As shown in FIG. 6, the following factors are considered: a reciprocity and a use scenario, namely, a non-ideal reciprocity (o is reported for a capability 2-20), an ideal reciprocity (1 is reported for the capability 2-20), and no reciprocity.

3. Combining the Foregoing Implementation 1 with Separate Indication and Joint Indication An existing downlink TCI state pool is reused as a downlink TCI state pool, namely, tci-StatesToAddModList configured by using a PDSCH-Config IE. Alternatively, a downlink TCI state pool is newly created, and a newly created state pool may be at a BWP level or a cell level, in other words, placed in a DL-BWP IE or a ServingcellConfig IE. A size of the downlink TCI state pool is M, and M may be 128, 256, or the like.

A newly created uplink beam pool may be placed in a PUCCH-config IE, and may also be at the BWP level or the cell level, in other words, placed in an UL-BWP IE or the ServingcellConfig IE. A size of an uplink TCI state pool is N, and N may be 64, 128, or the like.

Joint indication manner 1: When DL and UL TCI states are jointly indicated, only a downlink TCI state pool may be used as a joint TCI state pool; or when DL and UL TCI states are jointly indicated, a downlink TCI state pool and an uplink TCI state pool may be jointly indexed, to serve as a joint TCI state pool.

Joint indication manner 2: When DL and UL TCI states are jointly indicated, a downlink TCI state pool may be used in downlink, and an uplink TCI state pool may be used in uplink.

Separate indication: When DL and UL TCI states are separately indicated, a downlink TCI state pool is used in downlink, and an uplink TCI state pool is used in uplink.

For the joint indication manner 1, the joint indication manner 2, and the separate indication, indication may be performed in an implicit manner.

Implicit manner 1: When the terminal reports that a beam correspondence capability is supported, and only a downlink TCI state pool is configured, the joint indication manner 1 is implicitly supported currently.

Implicit manner 2: When the terminal reports that a beam correspondence capability is supported, and uplink and downlink TCI state pools are configured, the joint indication manner 2 is implicitly supported currently.

Implicit manner 3: When the terminal reports that a beam correspondence capability is not supported or a non-ideal beam correspondence capability is supported, and uplink and downlink TCI state pools are configured, the separate indication is implicitly supported currently.

For the joint indication manner 1, the joint indication manner 2, and the separate indication, indication may be performed by using explicit signaling. The joint indication manner 1, the joint indication manner 2, and the separate indication may be used to complete indication in the following scenarios:

DL-only TCI state (separate indication)
UL-only TCI state (separate indication)
DL+UL with same TCI state ID (joint indication manner 1)
DL+UL with different TCI state ID (joint indication manner 2)

Explicit signaling indication 1: As shown in FIG. 7 or FIG. 8, when the foregoing function indication is completed by using one MAC-CE, a field in the MAC-CE includes a combination of one or more of the following:

a serving cell ID, 5 bits; or a serving cell group ID;
one BWP ID, 2 bits, identifying a same BWP in uplink and downlink; or two BWP IDs, one identifying an uplink BWP, and the other identifying a downlink BWP, 4 bits;
an uplink TCI state ID, 6, 7, 8, or log 2 (a quantity of uplink TCI states configured by using RRC) bits, indicating a used TCI state;
a downlink TCI state ID, 6, 7, 8, or log 2 (a quantity of uplink TCI states configured by using RRC) bits, indicating a used TCI state;
a channel or signal identifier, indicating a channel or signal range on which a TCI state acts;
if a uniform transmission configuration indication state indication identifier is added to a channel or signal configured by using RRC, the field indicates a corresponding identifier; or for different channels (groups) or signals (groups), 1 bit or N bits are separately used to indicate whether common TCI is supported;
a TRP identifier, 1 bit; usually a coresetpoolindex (control resource set pool sub-index, control resource set pool index) index; identifying two TRPs; or
optionally, an uplink and downlink joint or separate indication identifier; 2 bits; indicating an action and behavior of the following field:
there is only an uplink TCI state (DL-only TCI state);
there is only a downlink TCI state (UL-only TCI state);
there is a same TCI state in uplink and downlink (DL+UL with same TCI state ID); or
there are different TCI states in uplink and downlink (DL+UL with different TCI state ID).

Explicit signaling indication 2: As shown in FIG. 9 or FIG. 10, when the foregoing function activation is completed by using one MAC-CE, a field in the MAC-CE includes:

a serving cell ID, 5 bits; or a serving cell group ID;

one BWP ID, 2 bits, identifying a same BWP in uplink and downlink; or two BWP IDs, one identifying an uplink BWP, and the other identifying a downlink BWP, 4 bits;

an uplink TCI state ID, (6, 7, or 8)×N bits or log 2 (a quantity of TCI states configured by using RRC)×N bits, indicating a used TCI state; or a bitmap form, mapping to a TCI state pool configured by using RRC, 128 or 256 bits;

a downlink TCI state ID, (6, 7, or 8)×N bits or log 2 (a quantity of TCI states configured by using RRC)×N bits, indicating a used TCI state; or a bitmap form, mapping to a TCI state pool configured by using RRC, 128 or 256 bits;

a channel or signal identifier, indicating a channel or signal range on which a TCI state acts;

if a common TCI identifier is added to a channel or signal configured by using RRC, the field indicates a corresponding identifier; or for different channels (groups) or signals (groups), 1 bit or N bits are separately used to indicate whether common TCI is supported;

a TRP identifier, 1 bit; usually a coresetpoolindex index; identifying two TRPs; or an uplink and downlink joint or separate indication identifier; 2 bits; indicating an action and behavior of the following field:

there is only an uplink TCI state (DL-only TCI state);

there is only a downlink TCI state (UL-only TCI state);

there is a same TCI state in uplink and downlink (DL+UL with same TCI state ID); or there are different TCI states in uplink and downlink (DL+UL with different TCI state ID).

Explicit signaling indication 3: When the joint indication manner 1 is used:

(1) If a MAC-CE is used for indication, an implementation process includes: The MAC-CE selects one TCI state from a TCI state pool as a unified TCI state, where a field in the MAC-CE includes a combination of one or more of the following:

a serving cell ID, 5 bits; or a serving cell group ID;

one BWP ID, 2 bits, identifying a same BWP in uplink and downlink; or two BWP IDs, one identifying an uplink BWP, and the other identifying a downlink BWP, 4 bits;

an uplink TCI state ID, 6, 7, 8, or log 2 (a quantity of uplink TCI states configured by using RRC) bits, indicating a used TCI state;

a channel or signal identifier, indicating a channel or signal range on which a TCI state acts;

if a common TCI identifier is added to a channel or signal configured by using RRC, the field indicates a corresponding identifier; or for different channels (groups) or signals (groups), 1 bit or N bits are separately used to indicate whether common TCI is supported; or a TRP identifier, 1 bit; usually a coresetpoolindex index; identifying two TRPs.

(2) If a MAC-CE is used for activation, and DCI is used for indication, an implementation process includes: The MAC-CE selects N TCI states from a TCI state pool as an activation set for DCI indication, where a value of N depends on a bit width of a DCI indication field and is usually 8, and a field in the MAC-CE includes a combination of one or more of the following:

a serving cell ID, 5 bits; or a serving cell group ID;

one BWP ID, 2 bits, identifying a same BWP in uplink and downlink; or two BWP IDs, one identifying an uplink BWP, and the other identifying a downlink BWP, 4 bits;

a TCI state ID, (6, 7, or 8)×N bits or log 2 (a quantity of TCI states configured by using RRC)×N bits, indicating a used TCI state; or a bitmap form, mapping to a TCI state pool configured by using RRC, 128 or 256 bits;

a channel or signal identifier, indicating a channel or signal range on which a TCI state acts;

if a common TCI identifier is added to a channel or signal configured by using RRC, the field indicates a corresponding identifier; or for different channels (groups) or signals (groups), 1 bit or N bits are separately used to indicate whether common TCI is supported; or a TRP identifier, 1 bit; usually a coresetpoolindex index; identifying two TRPs.

Explicit Signaling Indication 4: When the Joint Indication Manner 2 is Used:

(1) If a MAC-CE is used for indication, an implementation process includes: The MAC-CE separately selects one TCI state from an uplink TCI state pool and/or a downlink TCI state pool, to indicate an uplink and/or a downlink TCI state. A field in the MAC-CE includes a combination of one or more of the following:

a serving cell ID, 5 bits; or a serving cell group ID;

one BWP ID, 2 bits, identifying a same BWP in uplink and downlink; or two BWP IDs, one identifying an uplink BWP, and the other identifying a downlink BWP, 4 bits;

an uplink TCI state ID, 6, 7, 8, or log 2 (a quantity of uplink TCI states configured by using RRC) bits, indicating a used TCI state;

a downlink TCI state ID, 6, 7, 8, or log 2 (a quantity of uplink TCI states configured by using RRC) bits, indicating a used TCI state;

a channel or signal identifier, indicating a channel or signal range on which a TCI state acts;

if a common TCI identifier is added to a channel or signal configured by using RRC, the field indicates a corresponding identifier; or for different channels (groups) or signals (groups), 1 bit or N bits are separately used to indicate whether common TCI is supported;

a TRP identifier, 1 bit; usually a coresetpoolindex index; identifying two TRPs; or optionally, an uplink and downlink joint or separate indication identifier; 2 bits;

indicating an action and behavior of the following field:

there is only an uplink TCI state (DL-only TCI state);

there is only a downlink TCI state (UL-only TCI state);

there is a same TCI state in uplink and downlink (DL+UL with same TCI state ID); or there are different TCI states in uplink and downlink (DL+UL with different TCI state ID).

(2) If a MAC-CE is used for activation, and DCI is used for indication, an implementation process includes: The MAC-CE selects N TCI states and M TCI states from an uplink TCI state pool and a downlink TCI state pool respectively as an activation set for DCI indication, where values of N and M depend on a bit width of a DCI indication field, and are usually 8. A field in the MAC-CE includes a combination of one or more of the following:

a serving cell ID, 5 bits; or a serving cell group ID;

one BWP ID, 2 bits, identifying a same BWP in uplink and downlink; or two BWP IDs, one identifying an uplink BWP, and the other identifying a downlink BWP, 4 bits;

an uplink TCI state ID, (6, 7, or 8)×N bits or log 2 (a quantity of TCI states configured by using RRC)×N bits, indicating a used TCI state; or a bitmap form, mapping to a TCI state pool configured by using RRC, 128 or 256 bits;

a downlink TCI state ID, (6, 7, or 8)×N bits or log 2 (a quantity of TCI states configured by using RRC)×N bits, indicating a used TCI state; or a bitmap form, mapping to a TCI state pool configured by using RRC, 128 or 256 bits;

a channel or signal identifier, indicating a channel or signal range on which a TCI state acts;

if a common TCI identifier is added to a channel or signal configured by using RRC, the field indicates a corresponding identifier; or for different channels (groups) or signals (groups), 1 bit or N bits are separately used to indicate whether common TCI is supported;

a TRP identifier, 1 bit; usually a coresetpoolindex index; identifying two TRPs; or optionally, an uplink and downlink joint or separate indication identifier; 2 bits; indicating an action and behavior of the following field:

there is only an uplink TCI state (DL-only TCI state);

there is only a downlink TCI state (UL-only TCI state);

there is a same TCI state in uplink and downlink (DL+UL with same TCI state ID); or there are different TCI states in uplink and downlink (DL+UL with different TCI state ID).

Explicit signaling indication 5: When separate indication is performed, two MAC-CEs are respectively used for indicating or activating uplink and downlink.

It can be learned from the foregoing embodiment that, in this application, joint indication and separate indication may be implicitly or explicitly performed, and a plurality of indication manners may be implemented by using same MAC-CE signaling.

4. Combining the Foregoing Implementation 2 with Separate Indication and Joint Indication An existing downlink TCI state pool is reused as a downlink TCI state pool, namely, tci-StatesToAddModList configured by using a PDSCH-Config IE. Alternatively, a downlink TCI state pool is newly created, and the newly created state pool may be at a BWP level or a cell level, in other words, placed in a DL-BWP IE or a ServingcellConfig IE. A size of the downlink TCI state pool is M, and M may be 128, 256, or the like.

A beam pool may be newly created in uplink, may be placed in a PUCCH-config IE, and may also be at the BWP level or the cell level, in other words, placed in the UL-BWP IE or the ServingcellConfig IE. There are two manners. Manner 1: A second resource pool is newly added, a size is N, and M may be 64, 128, or the like. The second resource pool includes only a TCI state having an SRS as a source reference signal. In this case, an uplink TCI state pool is a downlink TCI state pool combined with the newly added second resource pool, and an index of the uplink TCI state pool is obtained by jointly indexing the downlink TCI state pool and the newly added second resource pool. Manner 2: An existing downlink TCI state pool is reused as an uplink TCI state pool. The manner 2 is used in a scenario with a reciprocity.

Joint indication manner: When DL and UL TCI states are jointly indicated, only the downlink TCI state pool may be used as a joint TCI state pool.

Separate indication manner 1: When DL and UL TCI states are separately indicated, a downlink TCI state pool is used in downlink, and a uplink TCI state pool is used in uplink. Separate indication manner 2: When DL and UL TCI states are separately indicated, a downlink TCI state pool is used in downlink, and a downlink TCI state pool and a newly added second resource pool are combined and used in uplink.

For the joint indication manner, the separate indication manner 1, and the separate indication manner 2, indication may be performed in an implicit manner.

When only a downlink TCI state pool is configured for the terminal, and MAC-CE joint and separate indication fields are combined, it is determined whether the joint indication manner or the separate indication manner 1 is currently supported.

When an uplink TCI state pool and a second part of a newly added TCI state pool are configured for the terminal, the separate indication manner 2 is implicitly supported currently.

For the joint indication manner, the separate indication manner 1, and the separate indication manner 2, indication may be performed by using explicit signaling. The joint indication manner, the separate indication manner 1, and the separate indication manner 2 may be used to complete indication in the following scenarios:

DL-only TCI state (separate indication)

UL-only TCI state (separate indication)

DL+UL with same TCI state ID (joint indication manner 1)

DL+UL with different TCI state ID (joint indication manner 2)

A MAC-CE design is similar to the combining the foregoing implementation 1 with separate indication and joint indication, and only a TCI state index range is changed. Details are not described herein again.

It can be learned from the foregoing embodiments that, in this application, joint indication and separate indication may be implicitly or explicitly performed. For an independent pool configuration (a part includes an SRS, and a part includes an SSB/a CSI-RS), this can implement a joint TCI state pool and a separate TCI state pool, reduce redundancy and complexity of system configuration and maintenance, reduce tracking and maintenance complexity of a terminal, and achieve better forward compatibility.

Figure 11:
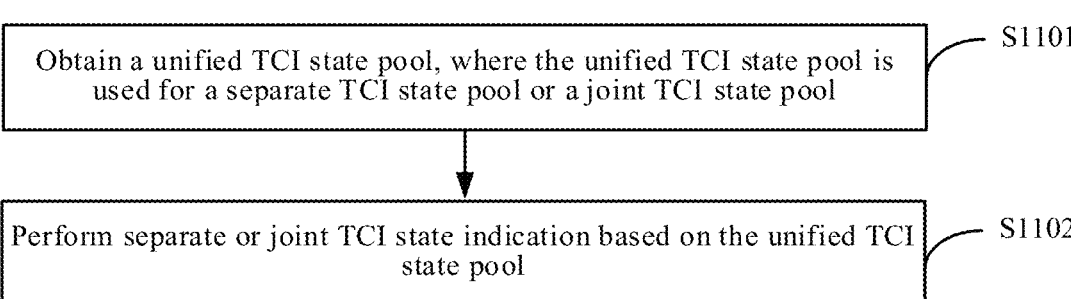
FIG. 11 is a schematic flowchart of a beam indication method according to an embodiment of this application.

Next, FIG. 11 is a schematic flowchart of a beam indication method according to an embodiment of this application. The method may be applied to a communication device, for example, a terminal. As shown in FIG. 11, the beam indication method may include the following steps.

Snot Obtain a unified TCI state pool, where the unified TCI state pool is used for a separate TCI state pool or a joint TCI state pool.

In an embodiment, the unified TCI state pool may include a first-part resource pool and a second-part resource pool. As shown in FIG. 5, the TCI pool part-1 is the first-part resource pool, and the TCI pool part-2 is the first-part resource pool.

When the unified TCI state pool is used for the joint TCI state pool, the joint TCI state pool is the first-part resource pool, or the second-part resource pool, or the first-part resource pool and the second-part resource pool. When the unified TCI state pool is used for the separate TCI state pool, the first-part resource pool is a downlink TCI state pool; and the second-part resource pool is an uplink TCI state pool, or the first-part resource pool and the second-part resource pool are uplink TCI state pools.

Specifically, when the unified TCI state pool is used for the joint TCI state pool, the first-part resource pool may be the joint TCI state pool, and the first-part resource pool is used for downlink TCI state indication or activation, and uplink TCI state indication or activation. Alternatively, the second-part resource pool may be the joint TCI state pool, and the second-part resource pool is used for downlink TCI state indication or activation, and uplink TCI state indication or activation. Alternatively, the first-part resource pool and the second-part resource pool may be the joint TCI state pool, and the first-part resource pool and the second-part resource pool are used for downlink TCI state indication or activation, and uplink TCI state indication or activation.

When the unified TCI state pool is used for the separate TCI state pool, the first-part resource pool may be used for downlink TCI state indication or activation; and the second-part resource pool is or the first-part resource pool and the second-part resource pool are used for uplink TCI state indication or activation.

In an embodiment, the first-part resource pool and the second-part resource pool include any one of the following:

the first-part resource pool includes a downlink TCI state, and the second-part resource pool includes an uplink TCI state;

the first-part resource pool includes a TCI state whose source reference signal is a downlink reference signal, and the second-part resource pool includes a TCI state whose source reference signal is an uplink reference signal; or the first-part resource pool includes a downlink TCI state, and the second-part resource pool includes an uplink TCI state that does not overlap the downlink TCI state, where the overlapping means that numbers or indexes of the TCI states are the same, or source reference signals of the TCI states are the same.

In an embodiment, the TCI state whose source reference signal is a downlink reference signal includes at least one of the following:

a TCI state having a CSI-RS (channel state information reference signal) as the source reference signal;

a TCI state having an SSB (synchronization signal block) as a source reference signal; or a TCI state in which a downlink channel is used as a reference source, where the downlink channel includes one or more of a PDCCH, a PDSCH, and a PBCH (physical broadcast channel).

The TCI state whose source reference signal is an uplink reference signal includes at least one of the following:

a TCI state having a sounding reference signal SRS as the source reference signal; or a TCI state in which an uplink channel is used as a reference source, where the uplink channel includes one or more of a PRACH (physical random access channel), a PUCCH, and a PUSCH.

In an embodiment, when a terminal has a reciprocity, the joint TCI state pool is the first-part resource pool, or the first-part resource pool and the second-part resource pool.

In an embodiment, when a terminal has no reciprocity, the first-part resource pool is used for downlink TCI state indication or activation, and the second-part resource pool is used for uplink TCI state indication or activation.

S1102: Perform separate or joint TCI state indication based on the unified TCI state pool.

In an embodiment, the performing separate or joint TCI state indication based on the unified TCI state pool includes:

when the separate indication is performed based on the separate TCI state pool, indicating or activating a first TCI state subset in the first-part resource pool and a second TCI state subset in the second-part resource pool by using a media access control-control element MAC-CE, where the first TCI state subset is used for downlink TCI state indication and the second TCI state subset is used for uplink TCI state indication; or indicating or activating a third TCI state subset in the first-part resource pool and a fourth TCI state subset in the first-part resource pool and the second-part resource pool by using a MAC-CE, where the third TCI state subset is used for downlink TCI state indication, and the fourth TCI state subset is used for uplink TCI state indication;

when the joint indication is performed based on the separate TCI state pool, performing joint indexing on the first-part resource pool and the second-part resource pool, and indicating or activating a fifth TCI state subset in the first-part resource pool and the second-part resource pool by using a MAC-CE, where the fifth TCI state subset is used for uplink state indication and downlink state indication; or performing separate indexing on the first-part resource pool and the second-part resource pool, and indicating or activating a sixth TCI state subset in the first-part resource pool and a seventh TCI state subset in the second-part resource pool by using a MAC-CE, where the sixth TCI state subset is used for downlink TCI state indication or activation, the seventh TCI state subset is used for uplink TCI state indication or activation, and the sixth TCI state subset and the seventh TCI state subset have a specified association relationship;

when the separate indication is performed based on the joint TCI state pool, indicating or activating each of two TCI state subsets in the joint TCI state pool by using one indication field of each of two MAC-CEs, where the two TCI state subsets are respectively used for downlink TCI state indication and uplink TCI state indication; or respectively indicating or activating two TCI state subsets in the joint TCI state pool by using two indication fields of one MAC-CE, where the two TCI state subsets are respectively used for downlink TCI state indication and uplink TCI state indication; and when the joint indication is performed based on the joint TCI state pool, indicating or activating each of two TCI state subsets in the joint TCI state pool by using one indication field of each of two MAC-CEs, where the two TCI state subsets are respectively used for downlink TCI state indication and uplink TCI state indication; or respectively indicating or activating two TCI state subsets in the joint TCI state pool by using two indication fields of one MAC-CE, where the two TCI state subsets are respectively used for downlink TCI state indication and uplink TCI state indication; or indicating or activating one TCI state subset in the joint TCI state pool by using one indication field of one MAC-CE, where the one TCI state subset is used for downlink TCI state indication and uplink TCI state indication.

In an embodiment, the performing separate or joint TCI state indication based on the unified TCI state pool includes:

explicitly performing separate or joint TCI state indication by using one indication field of RRC or a MAC-CE;

explicitly performing separate or joint TCI state indication by using at least one indication field of a MAC-CE or DCI; or implicitly performing separate or joint TCI state indication by using the unified TCI state pool, or a terminal beam correspondence capability, or a combination of the unified TCI state pool and the terminal beam correspondence capability.

The indication field is shown in FIG. 7, FIG. 8, FIG. 9, and FIG. 10.

In an embodiment, the performing separate or joint TCI state indication includes: performing TCI state indication under a specified condition, where the specified condition includes at least one of the following:

there is only an uplink TCI state;

there is only a downlink TCI state;

there is a same TCI state in uplink and downlink; or there are different TCI states in uplink and downlink.

In an embodiment, the performing separate or joint TCI state indication includes: performing separate or joint TCI state indication in one or more dimensions, where the plurality of dimensions include at least one of the following:

a plurality of carriers;

a plurality of target signals or channels;

a plurality of target transmission directions; or a plurality of terminals.

It can be learned from the foregoing embodiment that, a loose TCI state pool design is used, to implement the separate and joint TCI state pools and separate and joint TCI state indications, so that signaling overheads and a delay of beam indication are reduced. A loose TCI state pool is applicable to both separate indication and joint indication. One TCI state pool may be used in downlink, or may be used in uplink and downlink.

Figure 12:
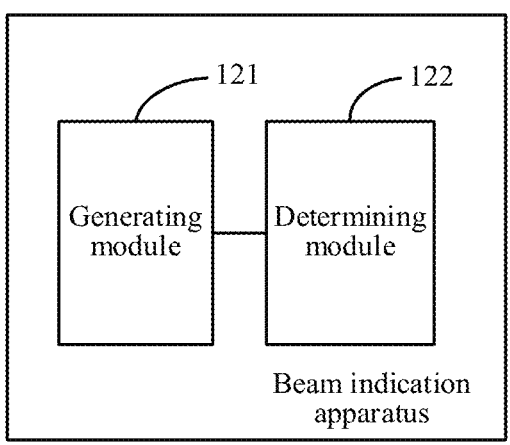
FIG. 12 is a schematic diagram of a structure of a beam indication apparatus according to an embodiment of this application.

FIG. 12 is a schematic diagram of a structure of a beam indication apparatus according to an embodiment of this application. The apparatus is used in a communication device, for example, a terminal. As shown in FIG. 12, the beam indication apparatus may include the following steps:

an obtaining module 121, configured to obtain a unified transmission configuration indication TCI state pool, where the unified TCI state pool is used for a separate TCI state pool or a joint TCI state pool; and an indication module 122, configured to perform separate or joint TCI state indication based on the unified TCI state pool.

In an embodiment, the unified TCI state pool includes a first-part resource pool and a second-part resource pool;

when the unified TCI state pool is used for the joint TCI state pool, at least one of the following is included:

the first-part resource pool is the joint TCI state pool, and the first-part resource pool is used for downlink transmission configuration indication TCI state indication or activation, and uplink TCI state indication or activation;

the second-part resource pool is the joint TCI state pool, and the second-part resource pool is used for downlink TCI state indication or activation, and uplink TCI state indication or activation; or the first-part resource pool and the second-part resource pool are the joint TCI state pool, and the first-part resource pool and the second-part resource pool are used for downlink TCI state indication or activation, and uplink TCI state indication or activation; and when the unified TCI state pool is used for the separate TCI state pool, the first-part resource pool is used for downlink TCI state indication or activation; and the second-part resource pool is or the first-part resource pool and the second-part resource pool are used for uplink TCI state indication or activation.

In an embodiment, the first-part resource pool and the second-part resource pool include any one of the following:

the first-part resource pool includes a downlink TCI state, and the second-part resource pool includes an uplink TCI state;

the first-part resource pool includes a TCI state whose source reference signal is a downlink reference signal, and the second-part resource pool includes a TCI state whose source reference signal is an uplink reference signal; or the first-part resource pool includes a downlink TCI state, and the second-part resource pool includes an uplink TCI state that does not overlap the downlink TCI state, where the overlapping means that numbers or indexes of the TCI states are the same, or source reference signals of the TCI states are the same.

In an embodiment, the TCI state whose source reference signal is a downlink reference signal includes: a TCI state in which a downlink channel is used as a reference source, where the downlink channel includes one or more of a physical downlink control channel PDCCH, a physical downlink shared channel PDSCH, and a physical broadcast channel PBCH.

The TCI state whose source reference signal is an uplink reference signal includes at least one of the following:

a TCI state having a sounding reference signal SRS as the source reference signal; or a TCI state in which an uplink channel is used as a reference source, where the uplink channel includes at least one of the following:

a TCI state having a channel state information reference signal CSI-RS as the source reference signal;

a TCI state having a synchronization signal block SSB as the source reference signal; or one or more of a physical random access channel PRACH, a physical uplink control channel PUCCH, and a physical uplink shared channel PUSCH.

In an embodiment, when a terminal has a reciprocity, the joint TCI state pool is the first-part resource pool, or the first-part resource pool and the second-part resource pool.

In an embodiment, when a terminal has no reciprocity, the first-part resource pool is used for downlink TCI state indication or activation, and the second-part resource pool is used for uplink TCI state indication or activation.

In a possible implementation, the indication module includes:

a first indication submodule, configured to: when the separate indication is performed based on the separate TCI state pool, indicate or activate a first TCI state subset in the first-part resource pool and a second TCI state subset in the second-part resource pool by using a media access control-control element MAC-CE, where the first TCI state subset is used for downlink TCI state indication and the second TCI state subset is used for uplink TCI state indication; or indicate or activate a third TCI state subset in the first-part resource pool and a fourth TCI state subset in the first-part resource pool and the second-part resource pool by using a MAC-CE, where the third TCI state subset is used for downlink TCI state indication, and the fourth TCI state subset is used for uplink TCI state indication;

a second indication submodule, configured to: when the joint indication is performed based on the separate TCI state pool, perform joint indexing on the first-part resource pool and the second-part resource pool, and indicate or activate a fifth TCI state subset in the first-part resource pool and the second-part resource pool by using a MAC-CE, where the fifth TCI state subset is used for uplink state indication and downlink state indication; or perform separate indexing on the first-part resource pool and the second-part resource pool, and indicate or activate a sixth TCI state subset in the first-part resource pool and a seventh TCI state subset in the second-part resource pool by using a MAC-CE, where the sixth TCI state subset is used for downlink TCI state indication or activation, the seventh TCI state subset is used for uplink TCI state indication or activation, and the sixth TCI state subset and the seventh TCI state subset have a specified association relationship;

a third indication submodule, configured to: when the separate indication is performed based on the joint TCI state pool, indicate or activate each of two TCI state subsets in the joint TCI state pool by using one indication field of each of two MAC-CEs, where the two TCI state subsets are respectively used for downlink TCI state indication and uplink TCI state indication; or respectively indicate or activate two TCI state subsets in the joint TCI state pool by using two indication fields of one MAC-CE, where the two TCI state subsets are respectively used for downlink TCI state indication and uplink TCI state indication; and a fourth indication submodule, configured to: when the joint indication is performed based on the joint TCI state pool, indicate or activate each of two TCI state subsets in the joint TCI state pool by using one indication field of each of two MAC-CEs, where the two TCI state subsets are respectively used for downlink TCI state indication and uplink TCI state indication; or respectively indicate or activate two TCI state subsets in the joint TCI state pool by using two indication fields of one MAC-CE, where the two TCI state subsets are respectively used for downlink TCI state indication and uplink TCI state indication; or indicate or activate one TCI state subset in the joint TCI state pool by using one indication field of one MAC-CE, where the one TCI state subset is used for downlink TCI state indication and uplink TCI state indication.

In an embodiment, the indication module 122 includes at least one of the following:

a fifth indication submodule, configured to explicitly perform separate or joint TCI state indication by using one indication field of radio resource control RRC or a MAC-CE;

a sixth indication submodule, configured to explicitly perform separate or joint TCI state indication by using at least one indication field of a MAC-CE or downlink control information DCI; or a seventh indication submodule, configured to implicitly perform separate or joint TCI state indication by using the unified TCI state pool, or a terminal beam correspondence capability, or a combination of the unified TCI state pool and the terminal beam correspondence capability.

In an embodiment, the indication module 122 includes:

an eighth indication submodule, configured to perform separate or joint TCI state indication, including: performing TCI state indication under a specified condition, where the specified condition includes at least one of the following:

there is only an uplink TCI state;

there is only a downlink TCI state;

there is a same TCI state in uplink and downlink; or there are different TCI states in uplink and downlink.

In an embodiment, the indication module 122 includes:

a ninth indication submodule, configured to perform separate or joint TCI state indication in one or more dimensions, where the plurality of dimensions include at least one of the following:

a plurality of carriers;

a plurality of target signals or channels;

a plurality of target transmission directions; or a plurality of terminals.

It should be understood that the apparatus is configured to perform the beam indication method in the embodiment shown in FIG. 11. An implementation principle and a technical effect of a corresponding program module in the apparatus are similar to those described in the beam indication method in the embodiment shown in FIG. 11. For a working process of the apparatus, refer to a corresponding process in the beam indication method in the embodiment shown in FIG. 11. Details are not described herein again.

Figure 13:
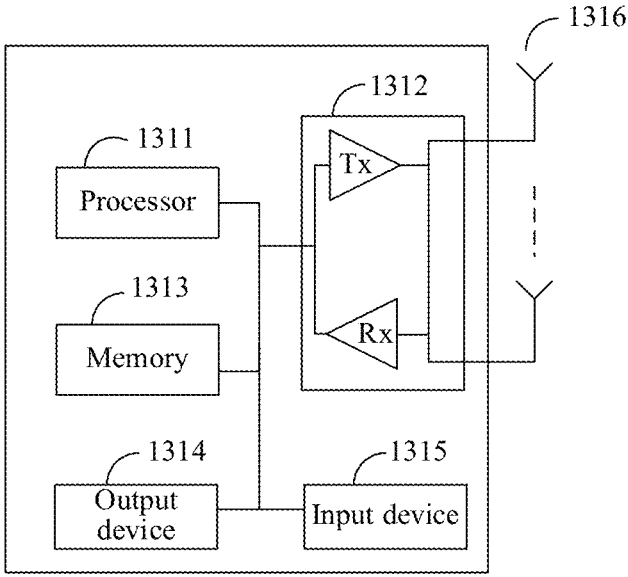
FIG. 13 is a schematic diagram of a structure of a terminal according to an embodiment of this application.

FIG. 13 is a schematic diagram of a structure of a terminal according to an embodiment of this application. The terminal may implement the beam indication method. For ease of description, FIG. 13 shows main components of the terminal. As shown in FIG. 13:

The terminal includes at least one processor 1311, at least one transceiver 1312, and at least one memory 1313. The processor 1311, the memory 1313, and the transceiver 1312 are connected. Optionally, the terminal may further include an output device 1314, an input device 1315, and one or more antennas 1316. The antenna 1316 is connected to the transceiver 1312, and the output device 1314 and the input device 1315 are connected to the processor 1311.

The processor 1311 is mainly configured to: process a communication protocol and communication data, control the entire terminal, execute a software program, and process data of the software program.

In an optional implementation, the terminal device may include a baseband processor and a central processing unit. The baseband processor is mainly configured to process the communication protocol and the communication data. The central processing unit is mainly configured to control the entire terminal device, execute the software program, and process the data of the software program.

Functions of the baseband processor and the central processing unit may be integrated into the processor in FIG. 13. A person skilled in the art may understand that the baseband processor and the central processing unit may be processors independent of each other, and are interconnected by using a technology such as a bus. A person skilled in the art may understand that the terminal device may include a plurality of baseband processors to adapt to different network standards, and the terminal device may include a plurality of central processing units to enhance a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. The function of processing the communication protocol and the communication data may be built in the processor, or may be stored in the memory in a form of a software program, and the processor executes the software program to implement a baseband processing function.

The memory 1313 is mainly configured to store the software program and data. The memory 1313 may exist independently, and is connected to the processor 1311. Optionally, the memory 1313 and the processor 1311 may be integrated together, for example, integrated in one chip, namely, an on-chip memory, or the memory 1313 is an independent storage element. This is not limited in this embodiment of this application. The memory 1313 can store program code for executing the technical solutions in embodiments of this application, and the processor 1311 controls execution of the program code. Various types of computer program code that are executed may also be considered as drivers of the processor 1311.

The transceiver 1312 may be configured to: perform conversion between a baseband signal and a radio frequency signal and process the radio frequency signal. The transceiver 1312 may be connected to the antenna 1316. The transceiver 1312 includes a transmitter (Tx) and a receiver (Rx). Specifically, the one or more antennas 1316 may receive a radio frequency signal. The receiver Rx of the transceiver 1312 is configured to: receive the radio frequency signal from the antenna, convert the radio frequency signal into a digital baseband signal or a digital intermediate frequency signal, and provide the digital baseband signal or the digital intermediate frequency signal for the processor 1311, so that the processor 1311 performs further processing on the digital baseband signal or the digital intermediate frequency signal, for example, performs demodulation processing and decoding processing. In addition, the transmitter Tx of the transceiver 1312 is configured to: receive a modulated digital baseband signal or a modulated digital intermediate frequency signal from the processor 1311, convert the modulated digital baseband signal or the modulated digital intermediate frequency signal into a radio frequency signal, and send the radio frequency signal through the one or more antennas 1316. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or the modulated digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as a digital signal. Optionally, the transmitter Tx and the receiver Rx may be implemented by different physical structures/circuits, or may be implemented by a same physical structure/circuit, in other words, the transmitter Tx and the receiver Rx may be inherited together.

The transceiver may also be referred to as a transceiver unit, a transceiver, a transceiver apparatus, or the like. Optionally, a component that is configured to implement a receiving function and that is in the transceiver unit may be considered as a receiving unit, and a component that is configured to implement a sending function and that is in the transceiver unit may be considered as a sending unit. In other words, the transceiver unit includes the receiving unit and the sending unit. The receiving unit may also be referred to as a receiver, an input port, a receiving circuit, or the like. The sending unit may be referred to as a transmitter, a transmitting circuit, or the like. Alternatively, the Tx, the Rx, and the antenna may be combined into a transceiver.

The output device 1314 displays information in a plurality of manners. For example, the output device 1314 may be a liquid crystal display (LCD), a light emitting diode (LED) display device, a cathode ray tube (CRT) display device, or a projector. The input device 1315 may receive an input of a user in a plurality of manners. For example, the input device 1315 may be a mouse, a keyboard, a touchscreen device, a sensing device, or the like.

An embodiment of this application further provides a computer storage medium. The computer storage medium includes computer instructions. When the computer instructions are run, the foregoing beam indication method is performed.

An embodiment of this application further provides a computer program product. The computer program product includes computer instructions. When the computer instructions are run, the foregoing beam indication method is performed.

All or some of the foregoing embodiments may be implemented by using software, hardware, firmware, or any combination thereof. When software is used to implement the embodiments, the embodiments may be all or partially implemented in a form of a computer program product. The computer program product includes one or more computer instructions. When the computer program instructions are loaded and executed on a computer, the procedures or the functions according to embodiments of this application are all or partially generated. The computer may be a general-purpose computer, a dedicated computer, a computer network, or another programmable apparatus. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, including one or more usable media that are integrated. The usable medium may be a magnetic medium (for example, a floppy disk, a hard disk, or a magnetic tape), an optical medium (for example, a DVD), a semiconductor medium (for example, a solid-state drive (SSD)), or the like.

It may be understood that various numbers in embodiments of this application are merely used for differentiation for ease of description, and are not used to limit the scope of embodiments of this application.

What is claimed is:

1. A method, comprising:
obtaining an indication field of radio resource control (RRC), wherein the indication field indicates joint indication or separate indication for transmission configuration indication (TCI) states;
based on the indication field, satisfying:
obtaining a first resource pool configured by a physical downlink shared channel configuration (PDSCH-Config) information element, wherein, when the indication field indicates the joint indication for TCI states, the first resource pool is for TCI state joint indication; or obtaining an uplink TCI state pool configured by an uplink (UL)-bandwidth part (BWP) information element and the first resource pool configured by the PDSCH-Config information element, wherein, when the indication field indicates the separate indication for TCI states, the uplink TCI state pool is for uplink TCI state indication, and the first resource pool is for downlink TCI state indication.

2. The method according to claim 1, wherein a first size of the first resource pool is 128, and a second size of the uplink TCI state pool is 64.

3. The method according to claim 1, wherein the method further comprises:

based on the TCI states being separately indicated, obtaining at least one indication field of a media access control (MAC)-control element (CE) indicating: that there is an uplink TCI state and a downlink TCI state, or that there is an uplink TCI state ID and a downlink TCI state ID.

4. The method according to claim 3, wherein the MAC-CE further comprises two BWP ID indication fields, a first BWP ID indication field of the two BWP ID indication fields indicates an uplink BWP, and a second BWP ID indication field of the two BWP ID indication fields indicates a downlink BWP.

5. The method according to claim 1, wherein the method further comprises:

based on the TCI states being separately indicated:

obtaining at least one indication field of a MAC-CE indicating: that there is only an uplink TCI state, or that there is only a downlink TCI state; or obtaining at least one indication field of the MAC-CE indicating: that there is only an uplink TCI state ID, or that there is only a downlink TCI state ID.

6. The method according to claim 5, wherein the MAC-CE further comprises two BWP ID indication fields, a first BWP ID indication field of the two BWP ID indication fields indicates an uplink BWP, and a second BWP ID indication field of the two BWP ID indication fields indicates a downlink BWP.

7. The method according to claim 1, wherein the method further comprises:

based on the TCI states being jointly indicated, obtaining at least one indication field of a MAC-CE indicating that there is a same TCI state for an uplink TCI state and a downlink TCI state.

8. The method according to claim 7, wherein the MAC-CE further comprises two BWP ID indication fields, a first BWP ID indication field of the two BWP ID indication fields indicates an uplink BWP, and a second BWP ID indication field of the two BWP ID indication fields indicates a downlink BWP.

9. The method according to claim 7, wherein the MAC-CE further comprises a BWP ID indication field, and the BWP ID indication field indicates a same BWP for the uplink TCI state and the downlink TCI state.

10. The method according to claim 1, wherein the TCI states are separately or jointly indicated in one or more dimensions, and wherein the one or more dimensions comprise at least one of:

a plurality of carriers, a plurality of target signals or channels, a plurality of target transmission directions, or a plurality of terminals.

11. The method according to claim 1, wherein, based on the TCI states being jointly indicated, an uplink power control parameter is configured in a TCI state in the first resource pool, or wherein, based on the TCI states being separately indicated, the uplink power control parameter is configured in an uplink TCI state in the uplink TCI state pool.

12. An apparatus, comprising:

at least one processor, and one or more memories coupled to the at least one processor and storing programming instructions for execution by the at least one processor to perform operations comprising:

obtaining an indication field of radio resource control (RRC), wherein the indication field indicates joint indication or separate indication for transmission configuration indication (TCI) states;

based on the indication field, satisfying:

obtaining a first resource pool configured by a physical downlink shared channel configuration (PDSCH-Config) information element, wherein, when the indication field indicates the joint indication for TCI states, the first resource pool is for TCI state joint indication; or obtaining an uplink TCI state pool configured by an uplink (UL)-bandwidth part (BWP) information element and the first resource pool configured by the PDSCH-Config information element, wherein, when the indication field indicates the separate indication for TCI states, the uplink TCI state pool is for uplink TCI state indication and the first resource pool is for downlink TCI state indication.

13. The apparatus according to claim 12, wherein a first size of the first resource pool is 128, and a second size of the uplink TCI state pool is 64.

14. The apparatus according to claim 12, the operations further comprise:

based on the TCI states being separately indicated, obtaining at least one indication field of a media access control (MAC)-control element (CE) indicating: that there is an uplink TCI state and a downlink TCI state, or that there is an uplink TCI state ID and a downlink TCI state ID.

15. The apparatus according to claim 14, wherein the MAC-CE further comprises two BWP ID indication fields, a first BWP ID indication field of the two BWP ID indication fields indicates an uplink BWP, and a second BWP ID indication field of the two BWP ID indication fields indicates a downlink BWP.

16. The apparatus according to claim 12, wherein the operations further comprise:

based on the TCI states being separately indicated:

obtaining at least one indication field of a MAC-CE indicating: that there is only an uplink TCI state, or that there is only a downlink TCI state; or obtaining at least one indication field of the MAC-CE indicating: that there is only an uplink TCI state ID, or that there is only a downlink TCI state ID.

17. The apparatus according to claim 16, wherein the MAC-CE further comprises two BWP ID indication fields, a first BWP ID indication field of the two BWP ID indication fields indicates an uplink BWP, and a second BWP ID indication field of the two BWP ID indication fields indicates a downlink BWP.

18. The apparatus according to claim 12, wherein the operations further comprise:

based on the TCI states being jointly indicated, obtaining at least one indication field of a MAC-CE indicating that there is a same TCI state for an uplink TCI state and a downlink TCI state.

19. The apparatus according to claim 18, wherein the MAC-CE further comprises two BWP ID indication fields, a first BWP ID indication field of the two BWP ID indication fields indicates an uplink BWP, and a second BWP ID indication field of the two BWP ID indication fields indicates a downlink BWP.

20. The apparatus according to claim 18, wherein the MAC-CE further comprises a BWP ID indication field, and the BWP ID indication field indicates a same BWP for the uplink TCI state and the downlink TCI state.

21. The apparatus according to claim 12, wherein the TCI states are separately or jointly indicated in one or more dimensions, and wherein the one or more dimensions comprise at least one of:
 a plurality of carriers,
 a plurality of target signals or channels,
 a plurality of target transmission directions, or
 a plurality of terminals.

22. The apparatus according to claim 12,
 wherein, based on the TCI states being jointly indicated, an uplink power control parameter is configured in a TCI state in the first resource pool, or
 based on the TCI states being separately indicated, the uplink power control parameter is configured in an uplink TCI state in the uplink TCI state pool.

23. A non-transitory computer-readable storage medium, wherein the non-transitory computer-readable storage medium stores computer instructions for being executed by at least one processor to perform operations comprising:
 obtaining an indication field of radio resource control (RRC), wherein the indication field indicates joint indication or separate indication for transmission configuration indication (TCI) states;
 based on the indication field, satisfying:
  obtaining a first resource pool configured by a physical downlink shared channel configuration (PDSCH-Config) information element, wherein, when the indication field indicates the joint indication for TCI states, the first resource pool is for TCI state joint indication; or
  obtaining an uplink TCI state pool configured by an uplink (UL)-bandwidth part (BWP) information element and the first resource pool configured by the PDSCH-Config information element, wherein, when the indication field indicates the separate indication for TCI states, the uplink TCI state pool is for uplink TCI state indication and the first resource pool is for downlink TCI state indication.

24. The non-transitory computer-readable storage medium according to claim 23, wherein a first size of the first resource pool is 128, and a second size of the uplink TCI state pool is 64.

25. The non-transitory computer-readable storage medium according to claim 23, wherein the operations further comprise:
 based on the TCI states being separately indicated, obtaining at least one indication field of a media access control (MAC)-control element (CE) indicating: that there is an uplink TCI state and a downlink TCI state, or that there is an uplink TCI state ID and a downlink TCI state ID.

26. The non-transitory computer-readable storage medium according to claim 25, wherein the MAC-CE further comprises two BWP ID indication fields, a first BWP ID indication field of the two BWP ID indication fields indicates an uplink BWP, and a second BWP ID indication field of the two BWP ID indication fields indicates a downlink BWP.

27. The non-transitory computer-readable storage medium according to claim 23, wherein the operations further comprise:
 based on the TCI states being separately indicated:
  obtaining at least one indication field of a MAC-CE indicating: that there is only an uplink TCI state, or that there is only a downlink TCI state; or
  obtaining at least one indication field of the MAC-CE indicating: that there is only an uplink TCI state ID, or that there is only a downlink TCI state ID.

28. The non-transitory computer-readable storage medium according to claim 27, wherein the MAC-CE further comprises two BWP ID indication fields, a first BWP ID indication field of the two BWP ID indication fields indicates an uplink BWP, and a second BWP ID indication field of the two BWP ID indication fields indicates a downlink BWP.

29. The non-transitory computer-readable storage medium according to claim 23, wherein the operations further comprise:
 based on the TCI states being jointly indicated, obtaining at least one indication field of a MAC-CE indicating that there is a same TCI state for an uplink TCI state and a downlink TCI state.

30. The non-transitory computer-readable storage medium according to claim 29, wherein the MAC-CE further comprises two BWP ID indication fields, a first BWP ID indication field of the two BWP ID indication fields indicates an uplink BWP, and a second BWP ID indication field of the two BWP ID indication fields indicates a downlink BWP.

31. The non-transitory computer-readable storage medium according to claim 29, wherein the MAC-CE further comprises a BWP ID indication field, and the BWP ID indication field indicates a same BWP for the uplink TCI state and the downlink TCI state.

32. The non-transitory computer-readable storage medium according to claim 23, wherein the TCI states are separately or jointly indicated in one or more dimensions, wherein the one or more dimensions comprise at least one of:
 a plurality of carriers,
 a plurality of target signals or channels,
 a plurality of target transmission directions, or
 a plurality of terminals.

33. The non-transitory computer-readable storage medium according to claim 23,
 wherein based on the TCI states being jointly indicated, an uplink power control parameter is configured in a TCI state in the first resource pool; or
 wherein based on the TCI states being separately indicated, the uplink power control parameter is configured in an uplink TCI state in the uplink TCI state pool.

* * * * *